(12) United States Patent
Kaminka et al.

(10) Patent No.: US 11,607,814 B2
(45) Date of Patent: Mar. 21, 2023

(54) ROBOTIC COOPERATIVE SYSTEM

(71) Applicant: BAR-ILAN UNIVERSITY, Ramat Gan (IL)

(72) Inventors: Gal Kaminka, Kfar Saba (IL); Assaf Friedler, Ramat Efal (IL); Ari Yakir, Givat Shmuel (IL); Dan Erusalimchik, Hadera (IL); Yehuda Elmaliach, Petach Tikva (IL)

(73) Assignee: BAR-ILAN UNIVERSITY, Ramat Gan (IL)

( * ) Notice: Subject to any disclaimer, the term of this patent is extended or adjusted under 35 U.S.C. 154(b) by 94 days.

(21) Appl. No.: 17/184,742

(22) Filed: Feb. 25, 2021

(65) Prior Publication Data

US 2021/0178596 A1 Jun. 17, 2021

Related U.S. Application Data

(63) Continuation of application No. 15/771,354, filed as application No. PCT/IL2016/051163 on Oct. 27, 2016, now Pat. No. 10,960,544.

(Continued)

(51) Int. Cl.
*B25J 9/00* (2006.01)
*B25J 9/16* (2006.01)
(Continued)

(52) U.S. Cl.
CPC .............. *B25J 9/1682* (2013.01); *B25J 5/005* (2013.01); *B25J 9/162* (2013.01); *B25J 9/1612* (2013.01);
(Continued)

(58) Field of Classification Search
CPC ........ B25J 9/1682; B25J 5/005; B25J 9/1612; B25J 9/162; B25J 9/1664; B25J 9/1679;
(Continued)

(56) References Cited

U.S. PATENT DOCUMENTS 6,374,155 B1 4/2002 Wallach et al.
9,120,412 B2 9/2015 Cantor et al.
(Continued)

FOREIGN PATENT DOCUMENTS

CN 103144506 A 6/2013
EP 2559956 A1 * 2/2013 ............... F24J 2/461
(Continued)

OTHER PUBLICATIONS

Beck et al., "Vehicle routing and job shop scheduling: What's the difference", Proceedings of the 13th International Conference on Artificial Intelligence Planning and Scheduling, Jun. 10-14, 2003.

(Continued)

*Primary Examiner* — Ian Jen
(74) *Attorney, Agent, or Firm* — The Roy Gross Law Firm, LLC; Roy Gross

(57) ABSTRACT

An automatic method for autonomous interactions between robots, comprising an action of automatically receiving, by a transport robot, a request for transporting a service robot. The method comprises an action of automatically computing a location of the service robot. The method comprises an action of automatically moving the transport robot to the location of the service robot. The method comprises an action of automatically sending a signal from the service robot to the transport robot using a signal emitter incorporated into a mechanical element attached to the service robot. The method comprises an action of automatically coupling, using the signal, the mechanical element to a carrier element attached to the transport robot.

11 Claims, 7 Drawing Sheets

Related U.S. Application Data

(60) Provisional application No. 62/247,212, filed on Oct. 28, 2015.

(51) Int. Cl.
  *B25J 5/00* (2006.01)
  *G05D 1/02* (2020.01)
  *G05D 1/00* (2006.01)
  *B25J 11/00* (2006.01)

(52) U.S. Cl.
  CPC .......... *B25J 9/1664* (2013.01); *B25J 9/1679* (2013.01); *B25J 11/008* (2013.01); *G05D 1/0088* (2013.01); *G05D 1/0094* (2013.01); *G05D 1/0225* (2013.01)

(58) Field of Classification Search
  CPC ... B25J 11/008; G05D 1/0088; G05D 1/0094; G05D 1/0225
  See application file for complete search history.

(56) References Cited

U.S. PATENT DOCUMENTS

| | | |
|---|---|---|
| 2005/0231156 A1 | 10/2005 | Yan |
| 2012/0328395 A1 | 12/2012 | Jacobsen et al. |
| 2013/0338825 A1* | 12/2013 | Cantor ................. B60P 1/00 414/539 |
| 2014/0150806 A1 | 6/2014 | Hu et al. |
| 2014/0254896 A1 | 9/2014 | Zhou et al. |

FOREIGN PATENT DOCUMENTS

| | | |
|---|---|---|
| EP | 2559956 B1 | 2/2013 |
| JP | H0565766 A | 3/1993 |
| JP | H05119835 A | 5/1993 |
| JP | H07104849 A | 4/1995 |
| JP | 2005046926 A | 2/2005 |
| JP | 2007269425 A | 10/2007 |
| JP | 2012035077 A | 2/2012 |
| JP | 2014144493 A | 8/2014 |
| JP | 2014186680 A | 10/2014 |
| JP | 2017019392 A | 1/2017 |
| WO | 0245914 A1 | 6/2002 |
| WO | 2015051436 A1 | 4/2015 |

OTHER PUBLICATIONS

Dantzig et al., "The Truck Dispatching Problem" Management Science, 6 (1), pp. 80-91, Oct. 1959.

Frazzoli et al., "Decentralized algorithms for vehicle routing in a stochastic time-varying environment", Proceedings of the 43rd IEEE Conference on Decision and Control (CDC), Dec. 14-17, 2004, pp. 3357-3363 vol. 4.

Bertsimas et al., "A Stochastic and Dynamic Vehicle Routing Problem in the Euclidean Plane", Operations Research, 1991, 39 (4), pp. 601-615.

Wurman et al, "Coordinating Hundreds of Cooperative Autonomous Vehicles in Warehouses", Proceedings of the National Conference on Innovative Applications of Artificial Intelligence (IAAI), Jul. 22-26, 2007, pp. 1752-1760.

Chan et al, "The multiple depot, multiple traveling salesman facility-location problem: vehicle range, service frequency, and heuristic implementations", 2005, Mathematical and Computer Modeling 41, pp. 1035-1053.

MacAlpine et al., "SCRAM: Scalable Collision-avoiding Role Assignment with Minimal-makespan for Formational Positioning", Proceedings of the Twenty-Ninth Conference on Artificial Intelligence (AAAI), Jan. 25-30, 2015, pp. 2096-2102.

PCT Search Report for International Application No. PCT/IL2016/051163; dated Feb. 23, 2017; 7 pages.

PCT Written Opinion for International Application No. PCT/IL2016/051163; dated Feb. 23, 2017; 5 pages.

PCT Preliminary Report for International Application No. PCT/IL2016/051163; dated Oct. 27, 2016; 6 pages.

* cited by examiner

ROBOTIC COOPERATIVE SYSTEM

CROSS REFERENCE TO RELATED APPLICATIONS

This application is a continuation of U.S. Ser. No. 15/771,354 filed on Apr. 27, 2018 which is a National Phase of PCT Patent Application No. PCT/IL2016/051163 having International filing date of Oct. 27, 2016, which claims the benefit of priority of U.S. Provisional Application No. 62/247,212, filed Oct. 28, 2015 entitled "A robotic system for maintaining, servicing, and monitoring surfaces and solar energy panels." The contents of the above applications are all incorporated by reference as if fully set forth herein in their entirety

FIELD OF THE INVENTION

The invention relates to the field of robotics.

BACKGROUND

A robot may be described as an electromechanical machine that may be guided by a computer program or electronic circuitry, such as an embedded system and the like. Robots may be autonomous, semi-autonomous, or operator controlled, and may perform one or more tasks, such as industrial robots, medical operating robots, patent assist robots, dog therapy robots, collectively programmed swarm robots, unmanned aerial vehicle (UAV) drones, unmanned ground vehicle (UGV) drones, unmanned marine vehicle (UMV) drones, microscopic nano-robots, and the like. A robot may have electronic circuitry or control systems that provide instructions for the operation and/or motion of the robot when performing the one or more task.

Robotics technology deals with the design, construction, operation, and application of robots, as well as computer systems for their control, sensory feedback, and information processing. These technologies deal with automated machines that may perform one or more tasks, such as tasks in dangerous environments, manufacturing processes, repetitive tasks, dangerous tasks, and/or the like.

Navigation robots have been used to transport functional robots between sites where the functional robots perform the one or more tasks. These navigational and functional robots may be combined into a robotic system for managing multiple functional robots and transporting them between the sites where tasks may be performed.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a method for autonomous interactions between robots, comprising an action of receiving automatically, by a transport robot, a request for transporting a service robot. The method comprises an action of computing automatically a location of the service robot. The method comprises an action of moving automatically the transport robot to the location of the service robot. The method comprises an action of sending automatically a signal from the service robot to the transport robot using a signal emitter incorporated into a mechanical element attached to the service robot. The method comprises an action of coupling automatically, using the signal, the mechanical element to a carrier element attached to the transport robot.

In some embodiments, the method further comprises an action of transporting automatically the service robot by the transport robot to a new location, and an action of releasing automatically of the mechanical element from the carrier element by the transport robot.

In some embodiments, the new location is determined by: an action of locating automatically a region of the new location; an action of moving automatically of the transport robot with the coupled service robot to the region; an action of receiving automatically a sensor signal for locating the new location within the region; and an action of moving automatically of the transport robot to the location using the sensor signal.

In some embodiments, one or more of the location and the new location are work surfaces.

In some embodiments, the work surfaces are one from a group consisting of solar panels, ship hulls, airplanes hulls, vehicle hulls, building windows, concentrated solar power plant mirrors, and turbine blades.

In some embodiments, the method further comprises an action of orienting automatically the service robot parallel to one or more of the work surfaces to be serviced before the releasing, wherein the mechanical element comprises at least two parts, and wherein the orienting automatically is performed by articulation of the at least two parts.

In some embodiments, the articulating automatically is one or more from the group consisting of (i) an active articulation guided in real-time by controller instructions, (ii) fixed articulation for a preconfigured surface angle, and (iii) a passive articulation preconfigured for a range of surface angles, wherein the passive articulation comprises an articulating joint comprising a fixed angle element and a flexible angle element.

In some embodiments, the method further comprises an action of the transport robot servicing automatically one or more of the work surfaces.

In some embodiments, the method further comprises locating automatically a region of the service robot by the transport robot, and an action of moving automatically of the transport robot to the region of the service robot.

In some embodiments, the mechanical element is attached to the transport robot and the carrier element is attached to the service robot.

In some embodiments, the signal comprises an identification pattern.

In some embodiments, the method further comprises an action of transferring automatically of one or more of electrical signals, power, and servicing materials between the transport robot and the service robot.

In some embodiments, the method of claim 1, further comprising receiving automatically a drop-off request for the service robot.

In some embodiments, the drop-off request comprises one or more of a location and a region.

There is provided, in accordance with an embodiment, a robot coupling system comprising one or more service robot comprising a mechanical element, wherein the mechanical element comprises a localization signal emitter. The robot coupling system comprises one or more transport robot configured to receive automatically a request for transporting the one or more service robot. The one or more transport robot comprises a carrier element configured to couple automatically with the mechanical element. The one or more transport robot comprises a sensor configured to receive automatically a localization signal from the localization signal emitter. The one or more transport robot comprises a motor configured to move automatically the one or more transport robot from a location to a new location. The one or more transport robot comprises one or more hardware processor. The one or more transport robot comprises one or more storage unit comprising processor instruction encoded thereon.

In some embodiments, the one or more storage unit comprises processor instruction for instructing the one or more hardware processor to receive automatically a request for transporting the one or more service robot. The processor instructions instruct the one or more hardware processor to compute automatically a location of the one or more service robot and move the one or more transport robot to the location of the one or more service robot. The processor instructions instruct the one or more hardware processor to receive automatically a signal from the one or more service robot to the one or more transport robot using the emitter. The processor instructions instruct the one or more hardware processor to mechanically couple automatically the mechanical element to the carrier element using the signal. The processor instructions instruct the one or more hardware processor to transport automatically of the one or more service robot by the one or more transport robot to a new location. The processor instructions instruct the one or more hardware processor to release automatically of the mechanical element from the carrier element by the one or more transport robot.

In some embodiments, the robot coupling system further comprises processor instructions instruct the one or more hardware processor to locate automatically a region of the one or more service robot by the one or more transport robot, and move automatically of the one or more transport robot to the region of the one or more service robot.

In some embodiments, the new location is determined by: locating automatically a region of the new location; moving automatically of the one or more transport robot with the coupled one or more service robot to the region; receiving automatically a sensor signal for locating the new location within the region; and moving automatically of the one or more transport robot to the location using the sensor signal.

In some embodiments, one or more of the location and the new location are work surfaces.

In some embodiments, the work surfaces are one from a group consisting of solar panels, ship hulls, airplanes hulls, vehicle hulls, building windows, concentrated solar power plant mirrors, and turbine blades.

In some embodiments, the robot coupling system further comprises processor instructions for orienting automatically the service robot parallel to one or more of the work surfaces to be serviced before the releasing.

In some embodiments, the mechanical element is attached to the transport robot and the carrier element is attached to the service robot.

In some embodiments, the localization signal comprises and identification pattern.

In some embodiments, the mechanical element and carrier element are adapted to transfer of one or more of electrical signals, power, and servicing materials between the transport robot and the service robot.

There is provided, in accordance with an embodiment, a robot coupling assembly comprising a mechanical element comprising a localization signal emitter, wherein the mechanical element is attached to a service robot. The robot coupling assembly comprises a carrier element configured to couple with the mechanical element, wherein carrier element is attached to a transport robot.

In some embodiments, the mechanical element comprises a shaft and a male securing element, wherein the male securing element is larger, in at least one dimension, than the shaft.

In some embodiments, the carrier element comprises a guiding sub-assembly and a female securing element, wherein the female securing element is substantially the at least one dimension of the shaft such that the male securing element is coupled securely within the female securing element.

In some embodiments, the guiding sub-assembly comprises an opening and two guiding elements, wherein the opening is distal from the female securing element, wherein the at least one dimension of the opening is substantially larger than the at least one dimension of the shaft, and such that the guiding elements form a funnel between the opening and the female securing element.

In some embodiments, the two guiding elements are elongated material elements with two or more bends to define the opening and the funnel for guiding the mechanical element into the carrier element.

There is provided, in accordance with an embodiment, a robot system comprising
two or more service robots, each configured to perform automatically at least on servicing task on an object, and at plurality of transport robots, each configured to carry automatically one or more of the plurality of service robots between multiple sites, each site comprising one from the group consisting of one or more object, a mobile ground station, a charging station, a repair station, and a base station.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
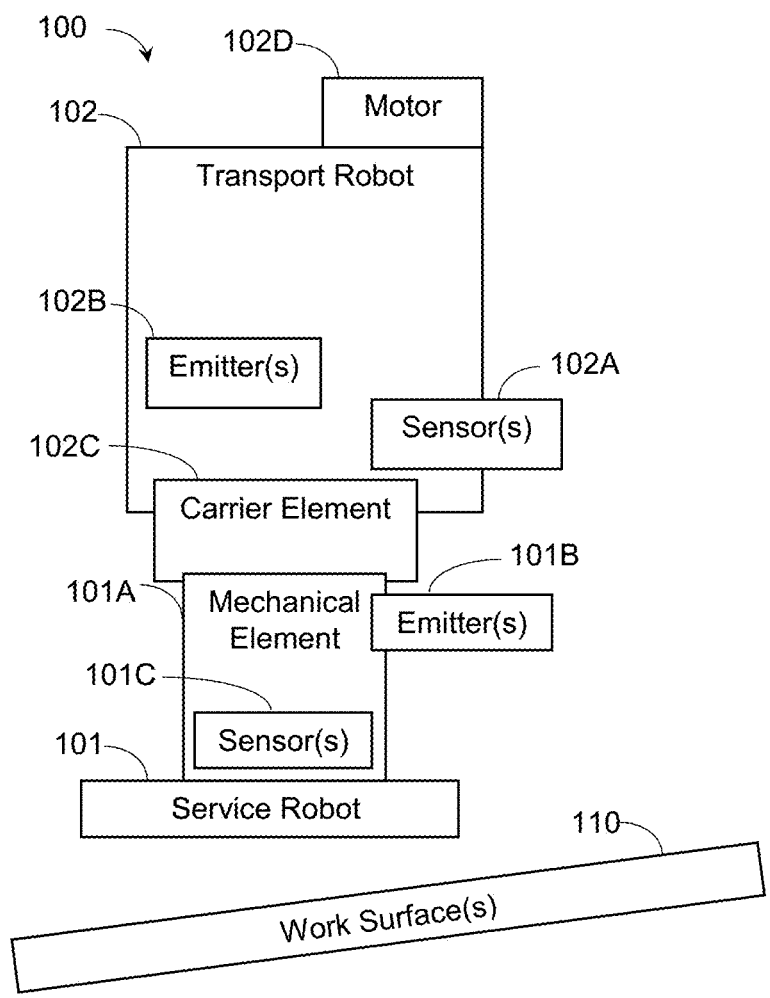
FIG. 1 shows a schematic illustration of a system for coupling between a transport robot and a service robot.

Described herein is a technique for using two or more types of robots, one of which is a transport robot, to service fields containing multiple separated surfaces. The transport robots may automatically move the other types of robots, such as service robots, between surfaces to service them. Described are embodiments of methods and devices for the autonomous operational and mechanical interactions between the two types of robots. The operational interactions may use mechanical coupling elements attached to each robot, such as an arm mechanical element, a carrier mechanical element, and/or the like, where coupling between the mechanical elements provides a transient mechanical connection between the transport and the service robots. The mechanical coupling elements may be configured to have at least dimension on one element to be larger than the corresponding dimension on the other element, so that the elements may couple together to support the weight of one robot by the other. Optionally, at least two dimensions of one mechanical elements are larger than the corresponding dimensions of the other mechanical element. The mechanical coupling elements may also incorporate matched emitters and sensors that exchange localization signals, which improve the coupling be sending motion signals to the respectively attached robots which allow the relative positioning between the two robots so that the coupling occurs without incident. For example, the emitter is a light source and the sensor is a camera. For example, the emitter is a radio wave directional antenna and the sensor is a directional receiving antenna. For example, the emitter is an acoustic wave generator and the sensor is an acoustic sensor.

Optionally, the localization signals sent automatically by an emitter comprise a signaling pattern that is unique to each individual robot, thereby improving the ability of a transport robot to locate an individual service robot without a crowd of service robots using the unique signaling pattern.

Optionally, electrical power, electrical signals, servicing materials, and the like are transferred automatically between a service robot and the transport robot. For example, measured values collected by sensors on a service robot are transferred automatically to the transport robot, and vice versa. For example, values from camera sensors on a service robot are transferred automatically, such as wirelessly, though the coupling connection, and the like, for identifying automatically a new location to detach the service robot from the transport robot. Optionally, signals, materials and/or energy is transferred automatically between a service robot and a transport robot. For example, the coupling elements include electrical and material transport connections that are used to automatically transfer energy and/or materials, such as cleaning fluids.

For example, a digital communication is transferred automatically from the service robot to the transport robot, such as a message from the service robot that it is safe for the transport robot to release the service robot. For example, a cleaning fluid is transferred between the transport robot and the service robot. For example, the service robot transfers electrical power/energy from the service robot's battery to the transport robot's battery. These automatic transfers may allow synergistic cooperation between the robots before, during, or after coupling to allow safe pickup/transport/drop-off. These transfers may allow automatic system-wide optimization of resources, such as energy, materials, and the like.

Optionally, sensors on a transport robot are connected to the transport robot such that a coupled service robot may not interfere with readings from the sensors, such as sensors attached to elongated mechanical appendages of the transport robot. For example, sensor values collected by the service robot are transferred automatically to the transport robot.

Reference is now made to FIG. 1, which is a schematic illustration of a system 100 for coupling between a transport robot and a service robot. System 100 comprises a service robot 101 and a transport robot 102. Service robot 101 services one or more work surfaces 110. Service robot comprises a mechanical element 101A including one or more emitters 101B that emit automatically a localization signal to assist coupling of a carrier element 102C (of the transport robot 102) with mechanical element 101A (of service robot 101). The localization signal is received automatically by one or more sensors 102A attached to transport robot 102. Optionally, service robot 101 comprises one or more sensors 101C and transport robot 102 comprises one or more emitters 102B to further assist the orientation and distance between mechanical element 101A and carrier element 102C and thereby assist the automatic coupling. Once automatic coupling is complete, transport robot 102 moves automatically service robot 101 to a new location using a motor 102D, such as one or more rotary wing, one or more marine motors, one or more wheeled motors, and the like. The new location may be work surface needing servicing, a mobile ground station for recharging/resupplying, a base station for repairing, and the like. Optionally, transport robot 102 assist automatically in the servicing, such as by applying fluids, removing dust, and the like.

Figure 2:
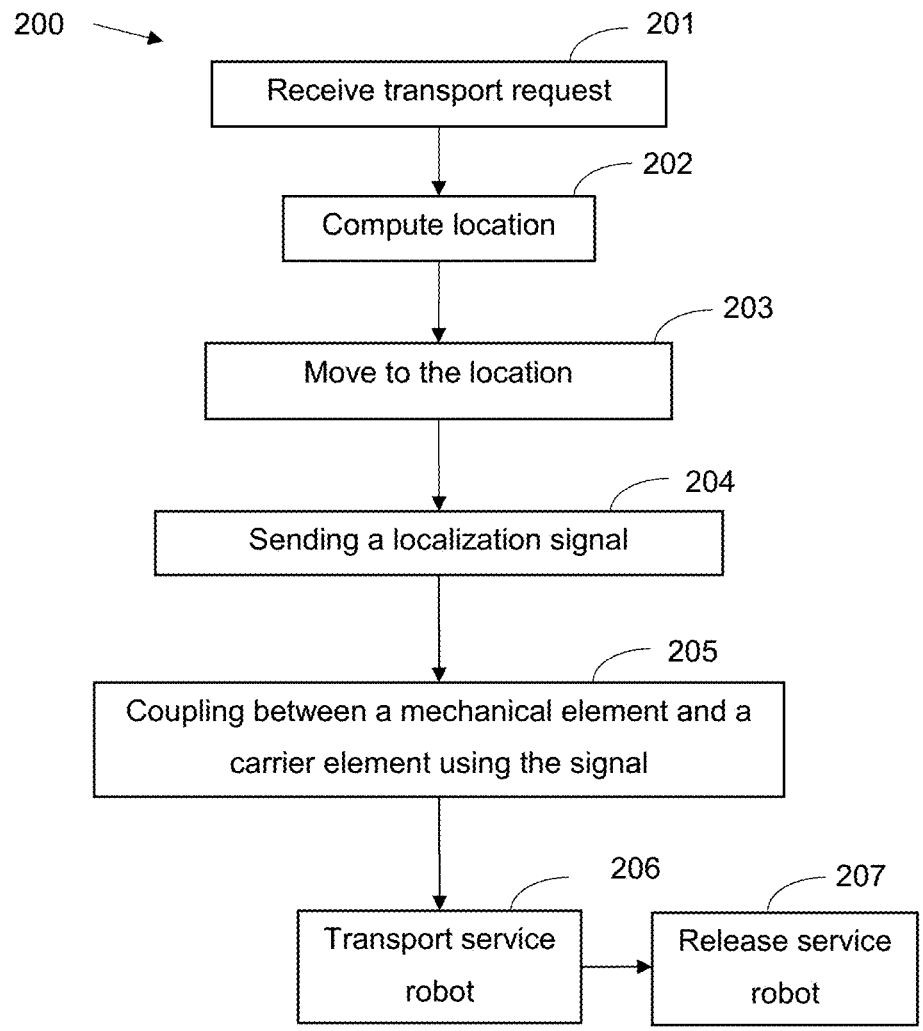
FIG. 2 shows a flowchart of a method for coupling between a transport robot and a service robot.

Reference is now made to FIG. 2, which is a flowchart 200 of a method for coupling automatically between a transport robot and a service robot. A transport request is automatically received 201 by transport robot 102, which automatically computes 202 a location of service robot 101 to be moved. Transport robot 102 automatically moves 203 to the computed location, where a localization signal automatically sent 204 by service robot 101 is automatically received by transport robot 102 to assist in coupling 205 between mechanical element 101A and carrier element 102C. When coupled 205, service robot 101 is automatically transported 206 to a new location, such as a work surface, base station, mobile ground station, and the like, and automatically released 207.

Figure 3:
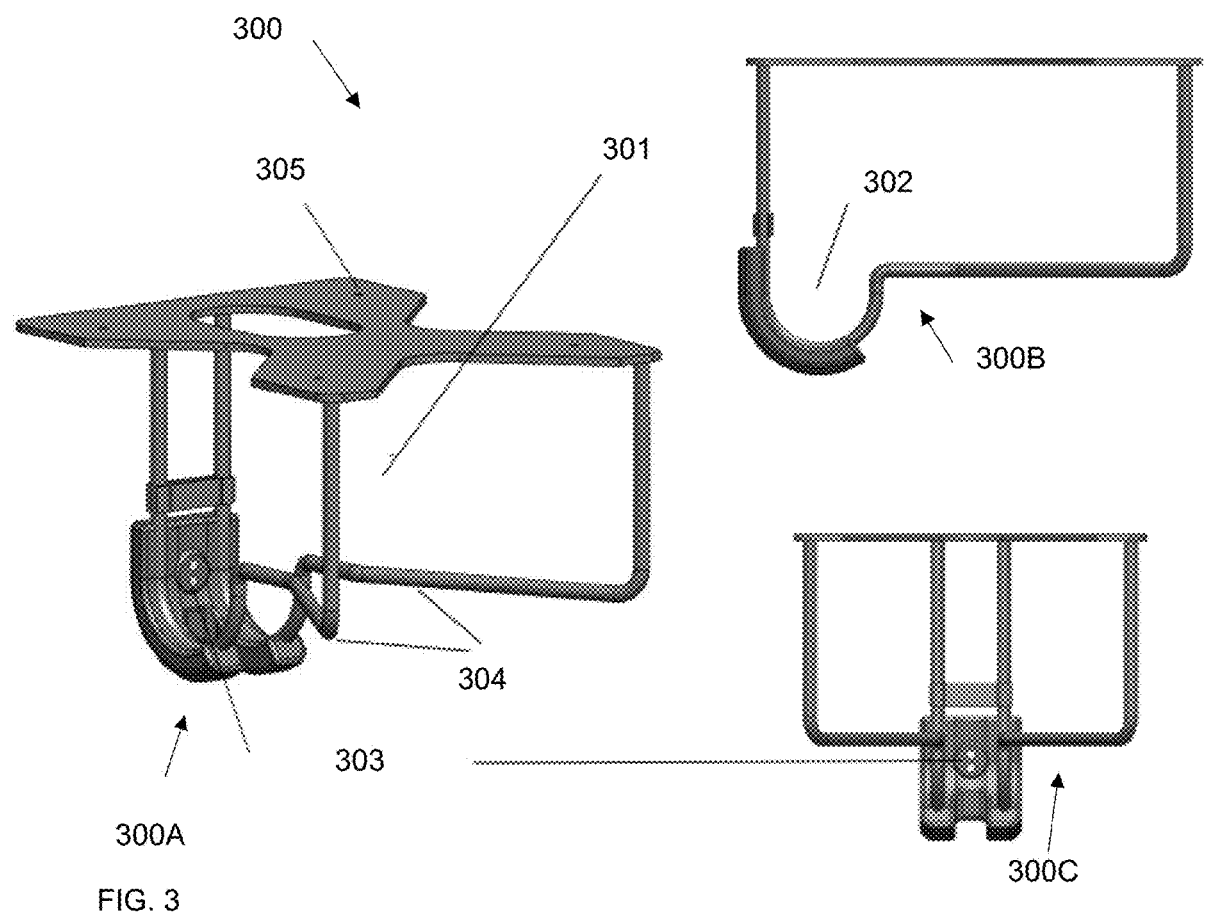
FIG. 3 shows a schematic illustration of a carrier element for coupling between a transport robot and a service robot.

Reference is now made to FIG. 3, which is a schematic illustration of a carrier element 300 for coupling between a transport robot and a service robot. Shown are a perspective view 300A, a side view 300B and a front view 300C. Carrier element 300 comprises an opening 301 for aligning the mechanical element and a female structural element 302 for coupling to the mechanical element. Carrier element 300 may comprise guiding members 304, optionally incorporating sensors, for guiding a male member of a mechanical element into opening 301 and into female structural element 302. Carrier element 300 may comprise sensors, electrical contacts, fluid conduits, and/or the like 303 for automatically positioning and aligning carrier element 300 with mechanical element. Carrier element 300 comprises a base 305 for attaching carrier element 300 to transport robot 102, such as on the underside of transport robot 102. The coupling may allow power from transport robot 102 to automatically power the sensors on the coupling elements, and any actuators. It also allows information from sensors to be transmitted to the UGV and UAV.

Figure 4:
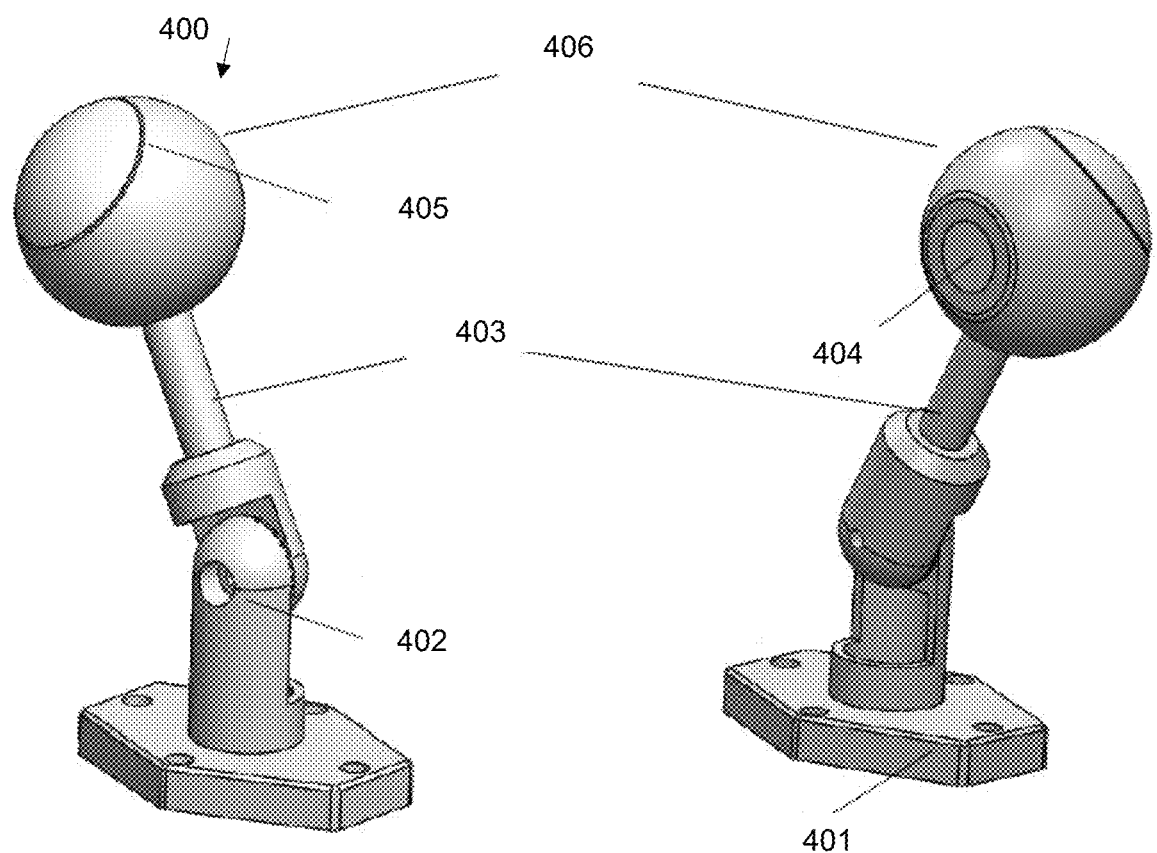
FIG. 4 shows a schematic illustration of a mechanical element for coupling between a transport robot and a service robot.

Reference is now made to FIG. 4, which is a schematic illustration of a mechanical element 400 for coupling between a transport robot and a service robot. Mechanical element 400 comprises a base 401 to attach mechanical element 400 to service robot 101. Mechanical element 400 may comprise an optional articulating joint 402 which may allow automatically orienting service robot 101 to a work surface 110 orientation. For example, the articulating joint separates the mechanical element into two parts, one proximal to service robot 101 and one distal to service robot 101.

Articulating joint 402 may be set at a fixed/passive orientation for work surfaces 110 that may be at the same orientation, such as solar panels, or dynamically/actively articulated for work surfaces 110 that may be at the different orientation, such as a vehicle/vessel hull. For example, an actively articulated joint may set a cleaning robot on each mirrored surface of a concentrated solar power plant at an orientation determined in real-time as the angle of the mirrored surface. For example, a solar power plant has PV panel work surfaces at fixed angles and the articulating joint is set a predetermined angle that substantially matches the angle of the solar panels. For example, a passive orientation articulating joint has a fixed angle element and a flexible angle element that together allow for a range of angles of the articulating joint, thereby allowing slight differences between the angle of the service robot and the angle of the surfaces. For example, the articulating joint has a combination of fixed, flexible and actively articulating elements.

For example, passive articulation allows some flexibility in the articulation angles for safe orienting. For example, as the service robot is automatically lowered onto the work surface, one or more of its wheels or tracks or bottom may touch the work surface. An appropriate sensor on the bottom of the robot will indicate this. The transport robot may then continue to lower the service robot to the work surface, until all the "bottom" sensors indicate that the service robot is touching the work surface. Then the transport robot will automatically receive a signal from the service robot, through the coupling elements, that it is safe to release the service robot. For example, four distance sensors on the service robot, such as one in each corner and the like, indicate that the service robot is completely in contact with the work surface. For example, when passive articulation is used the arm mechanical element has electrical connections that transfer sensor signals from the service robot's sensors to the transfer robot.

Mechanical element 400 may comprise magnetic field sensors and/or emitters 403, proximity sensors 404, and visible light signal emitters 405 for assisting in automatically positioning and/or orientating carrier element 300 with mechanical element 400 such that larger male structural element 406 may couple with a smaller female structural element 302, thereby allowing transport robot 102 to couple with service robot 101.

Optionally, carrier element 300 and/or mechanical element 400 may have elongated portions, such as elongated bodies, to allow safe coupling.

Figure 5:
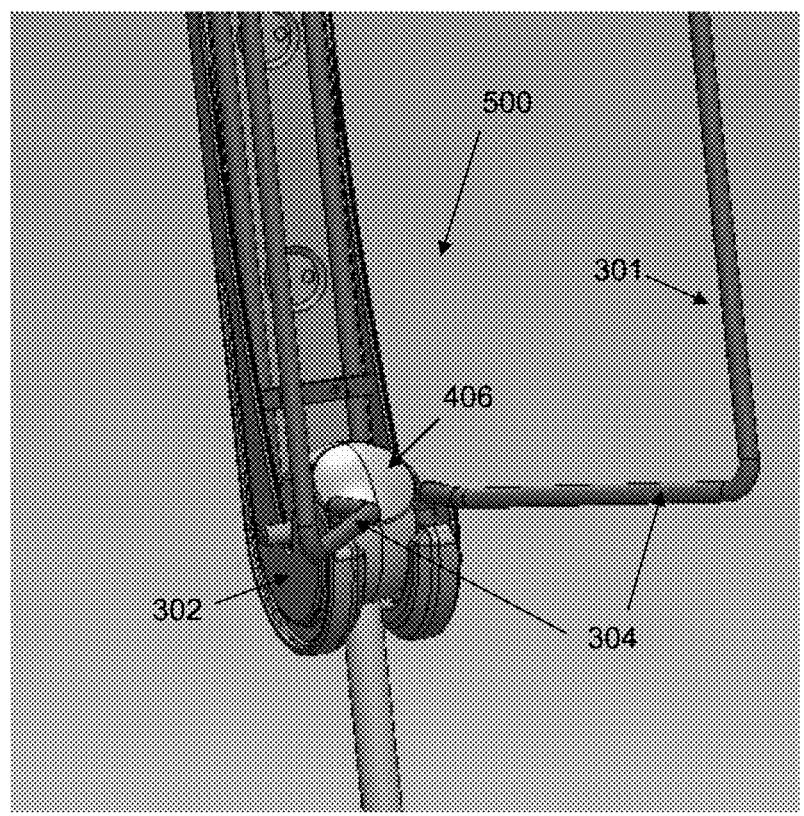
FIG. 5 shows a schematic illustration of a coupling between a transport robot's carrier element and a service robot's mechanical element.

Reference is now made to FIG. 5, which is a schematic illustration of a coupling 500 between a transport robot's carrier element and a service robot's mechanical element. Larger male structural element 406 is shown coupled 500 to a smaller female structural element 302, thereby allowing transport robot 102 to couple with service robot 101. Guiding members 304 form an opening to assist in automatically guiding the male structural element 406 into the female structural element 302.

Figure 6:
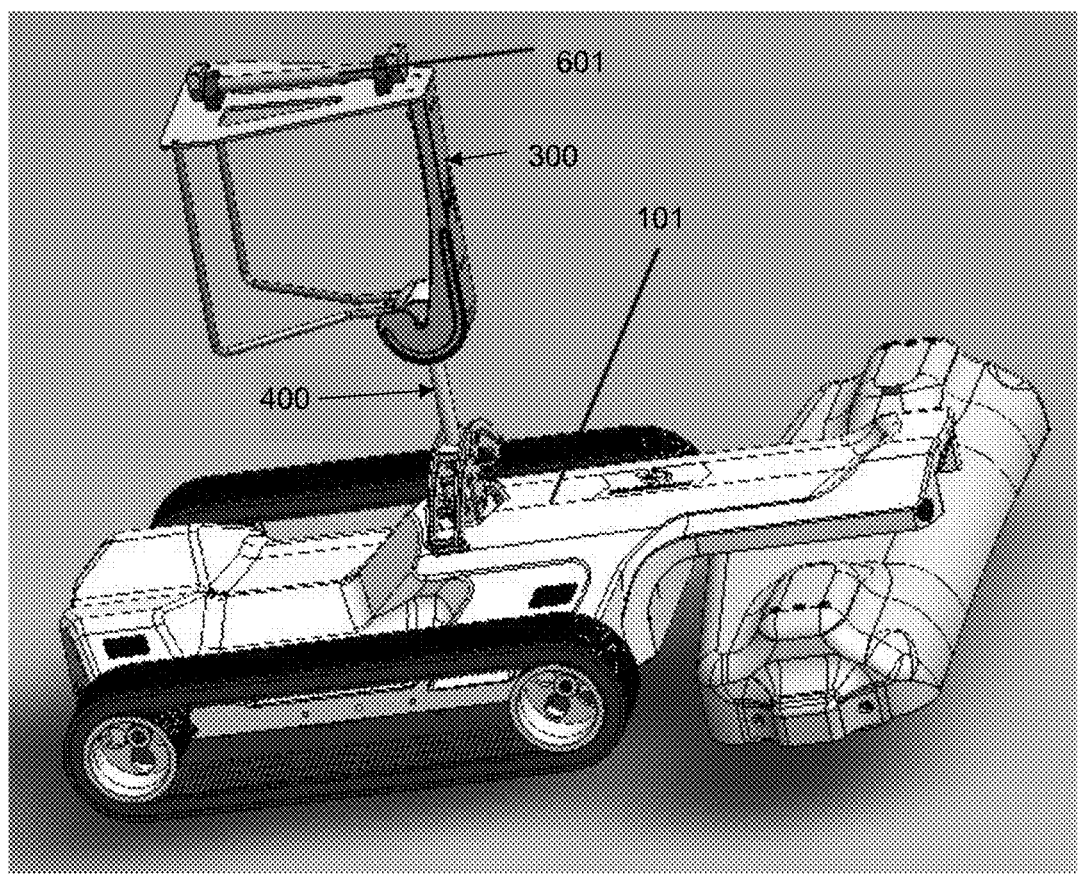
FIG. 6 shows a schematic illustration of an isometric view of a service robot coupled to a transport robot's carrier element using the service robot's mechanical element.

Reference is now made to FIG. 6, which is a schematic illustration of an isometric view of a service robot coupled to a transport robot's carrier element 300 using the service robot's mechanical element 400. Mechanical element 400 is attached to service robot 101 and carrier element 300 is attached to transport robot 102 with mechanical attachment 601.

Figure 7:
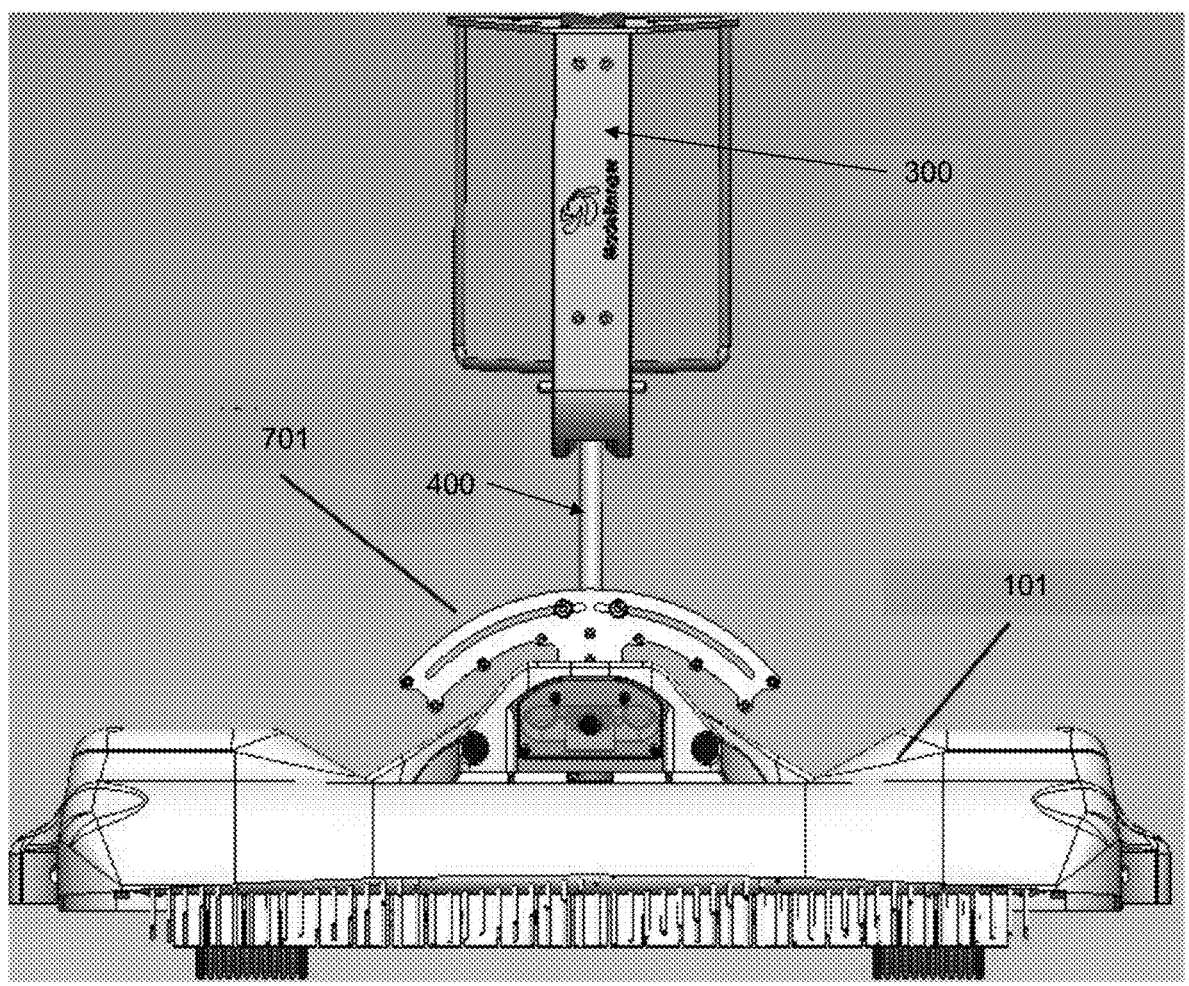
FIG. 7 shows a schematic illustration of a front view of a service robot coupled to a transport robot's carrier element using the service robot's mechanical element.

Reference is now made to FIG. 7, which is a schematic illustration of a front view of a service robot 101 coupled to a transport robot's carrier element using the service robot's mechanical element. Service robot 101 is coupled to mechanical element 400 using an orientation adjustment element 701. Mechanical element 400 is coupled to carrier element 300, such that energy and/or materials may be automatically transferred between the coupled robots. For example, a service robot transfers energy to the transport robot through the coupling. For example, a transport robot may use sensors of a service robot during flight, pickup, drop-off, and the like using the coupling. For example, transport element may automatically adjust orientation, shape, center of mass, size, moment of inertia, and the like using the coupling to make transport of the robot pair easier.

Example applications of collections ("fields") of physically-separated surfaces that may require frequent or regular inspection, diagnostics, maintenance, monitoring, or cleaning collectively referred to as "servicing". Such examples include (but are not limited to):

Solar photovoltaic (PV) power plants, which may be composed of two or more solar PV panel surfaces, forming rows or cells of various sizes, physically separated from each other yet part of the same power plant (such as a solar PV field. These PV panels may be inspected and cleaned from dust on a regular basis for the power plant to work at full capacity.

Windows on a single or multiple buildings form a collection of physically-separated surfaces that may be cleaned frequently for the buildings and windows to be visually attractive, and for the windows to be functional (i.e., allow the designed amount of transparency).

Concentrated solar power (CSP) plants may be composed of many mirrors. Each flat or curved mirror in may be require regular service to work at maximum power capacity.

Outer hulls of ships, airplanes, and vehicles to function correctly (e.g., to reduce friction with air or water), these hulls may be periodically cleaned, de-iced, treated with appropriate materials, and the like. The work surfaces may also be inspected for cracks, fissures, material faults, or other damages that may interfere with their operation. The work surfaces may be serviced to maintain their visual appeal (e.g., painted, cleaned).

The blades of air/wind turbine generating electricity constitute surfaces that may be separated from each other. These require regular servicing to maintain efficient power production and prevent faults.

To clarify, while the examples herein refer to surfaces that vary only in shape, size and placement, the invention also covers fields which contain surfaces that vary in other characteristics.

There are many examples of surface collections, such as solar fields, of physically-separated work surfaces that may need servicing, such as frequent or regular inspection, maintenance, monitoring, or cleaning, and the like. For example, solar photovoltaic (PV) power plants may be composed of two or more solar PV panel surfaces, forming rows or cells of various sizes, and physically separated from each other yet part of the same field. The solar panels may be automatically inspected and cleaned from dust on a regular basis, for the power plant to work at full capacity.

Automatic machines, such as robots, may be built to service a single surface, but it may be difficult to build a robot that may effectively service a single surface and move between surfaces within the field. Especially when the multiple surfaces are physically separated. To overcome the difficulty due to the mechanical and energy requirements of robot movement between surfaces, a coupling assemble between transport and service robots may be used.

Method actions of aspects of the embodiments described herein may be performed autonomously and/or automatically be preconfigured instructions to the robots. Optionally, the robots automatically store previous records of autonomous interactions to automatically apply corrective instructions to future interactions, such as changes to speed, acceleration, distances, and the like. For example, when the automatic release of a service robot by transport robot results in an audible sound above a threshold level, the distance sensors used for automatically performing the release may be calibrated for a smaller release distance value. Optionally, the robots are autonomous in performing their tasks, such as by automatically performing series of steps according within each autonomous scenario. For example, the robots are autonomous in their collective performance. Optionally, the robots are partially autonomous in performing their tasks and partially operated remotely by a human operator. Optionally, the human operator may override the autonomous behavior of a swarm of robots, such as based on heuristics, experience, standard operating procedures, safety requirements, and the like. Optionally, the automatic method actions may be overridden by a human operator, and recorded by the robots to improve performance and safety of the work surface, robots, tasks, and the like.

Following is a glossary of terms.

The term "robot" is used here to refer to an unmanned vehicular robot and/or system, which moves in/on air, water, ground, vacuum, such as in outer space, any combination of these, and/or the like on its own power. The system may be remotely guided by a human being, autonomous (automated), or semi-automated.

The term "service" is used to describe any operation taken by a robot to maintain, diagnose, monitor, inspect, improve, repair, or otherwise benefit a surface or another robot. For example: cleaning, applying chemical treatment remotely or by physical contact, imaging using wave frequencies in the visual or non-visual spectrum (e.g., including thermal and other forms of infra-red imaging), taking measurements using sensors or payloads (e.g., for inspection purposes), deploying payloads that relate to the recipient of the service (robot or surface or both), passing communications back and/or forth, transferring power (e.g., for electric charging and recharging), fuel (and refueling), or materials to and/or from the recipient, establishing a physical connection to the robot or surface, fixing damages or faults, etc.

The general term "servicing" includes also "recharge", used to describe the operation of docking a robot into a charging station, i.e., placing it sufficiently close to a specialized device where it may be refueled, electrically recharged, or otherwise have power transferred to it so that it may engage in later operations; optionally, the device may also provide storage, protection from the elements, etc. Recharging may also take place using a physical connection to a different robot, i.e., when one robot recharges another. Regardless of where and how the recharging operation takes place, for the sake of brevity, the term "charging robot" may refer to both the robot or station transferring energy.

The general term "servicing" includes also specifically "monitoring" and "diagnostics", is used to refer to identifying the status of a component or sub-system or an entire system, along any scale, directly measurable by sensing devices, or indirectly measurable by processing the output from sensing devices and/or combining such outputs. Optionally, monitoring includes also computation to differentiate nominal (correct, acceptable) states, from fault (abnormal, unacceptable) states.

A "service robot" may be adapted to apply a service as defined here into a surface.

A "transport robot" may be adapted to transport a service robot. It may also transport other transport robots. Transport robots may also be service robots, in the sense that they may also may be adapted to carry out services on surfaces or other robots.

The term "safe" is used to describe operations which do not harm or damage robots and surfaces involved, nor other objects.

The term "pickup" is used to describe the safe and controlled establishment of a physical connection between multiple robots, such that any optional subsequent movement of one or more of the robots (the "transport robots", one of which at least is a transport robot), moves also the other robots (the "service robots"). All robots together form a "pack". To clarify, a pack is not formed by a transport robot and a passive object, such as a surface. It may only be formed between robots.

Inversely, the term "drop-off" is used to describe the safe and controlled disbanding of a pack, by safe and controlled disengagement of the physical connection between robots, such that all robots involved in the pack may continue to move independently of each other.

The term "surface service task" is used to describe the operation of one or more robots carrying out service of a given surface.

The term "transport task" or "transport" is used to describe a sequence of safe and controlled pickup, followed by motion of the resulting pack, and drop-off. While the pack is in motion, the robots may also engage in a service operation in either one or both directions.

The term "pack service task" is used to describe a sequence of safe and controlled pickup, a service operation between robots in the pack (in either one or both directions), and drop-off.

The term "transport robot task" is used to describe the safe and controlled motion of an individual transport robot, unconnected to others (not part of a pack).

The term "coupling mechanical element" is used here to refer to the elements or mechanism facilitating physical connection between robots in a pack.

The term "arm" or "arm mechanical element" is used here to refer to the arm-like or mechanism facilitating physical connection between robots in a pack.

The term "carrier" or "carrier mechanical element" is used here to refer to the receiving element of the arm or mechanism facilitating physical connection between robots in a pack.

Coupling

The challenges of picking up, dropping off, servicing, and moving a robot by another robot may not be the same as picking up, dropping off, servicing and moving with a passive cargo (e.g., a package):

For example, robots of different types may require special hardware and software to coordinate their actions. For transport and pack service tasks, all robots may be present at the same location, at the same time, and be at a state of operation that is adapted to the joint tasks, without harming the surfaces or stations. For example, for a robot pickup task, the transport robots may locate and identify the service robots, and position themselves such that the service robot may be connected using the coupling elements, without applying damaging pressure on the surface. For example, transport robots may not add their own weight to the weight of the service robots already on the surface.

For example, during a robot drop-off, the transport robots may locate and identify the target surface or station, and may position the service robot precisely on the surface, without applying damaging pressure on the surface. In other words, transport robots may not add their own weight to the weight of the service robots when reaching the surface, and may not allow gravity or natural forces to move the service robots to the surface (e.g., service robots may not be dropped onto the surface, even from a small distance).

For example, for the transport and pack service operations to take place, coupling elements may are used to actively form the physical connection, such that transport and service robot may move together, and to coordinate their pickup/drop-off/service such as through transfer of data values through the mechanical elements. For example, the mechanical elements comprise digital and/or analog electrical connections for transferring the sensor information, location information, and the like.

Following is a description of a robotic servicing system.

Optionally, a robotic servicing system is composed of multiple robots, one or more control stations, one or more charging stations (which may also be the control stations) and one or more base-stations for storing robots (that may also serve as charging stations or control stations), that may be used for servicing surfaces. The system may be composed of several components:

Transport robots.
Service robots.
Base stations where robots may be serviced, recharged (refueled), and resupplied as necessary.
Control stations.
Repair stations.
Mobile ground stations.

The components may form packs of robots. The robots may carry out computation to process inputs, make decisions, communicate to each other and/or to control stations and/or base stations.

Control/base/charging stations where manual or computational processes may run to control and monitor the field, surfaces, other stations, and/or robots. The stations may also communicate with each other and with robots, and may carry out computation on their behalf.

The system may employ input from the robots and additional sources of information to identify the state of the surfaces (historically, currently, and projecting ahead). Likewise, the system may employ such input from the robots and other sources to identify the state of the robots, base stations, and control stations. The identified states may be presented to a human operator in the control stations, or may be used as input to automated processes.

Based on the information of (current, historical, and projected) states, the system may make recommendations as to which robot does what, and when, based on optimization criteria. The recommendation may be adapted by the system autonomously, or it may be presented to a human operator for review, modification, execution and/or approval towards execution. This presentation may also be made at the control stations. The system may adjust (or allow a human operator to adjust, locally or remotely) its optimization criteria.

The control stations may allow a human operator to monitor the autonomous operation of the robots, to monitor the state of the robots themselves, to intervene in the robots' operation by directing, commanding, or tele-operating them, to monitor the surfaces being serviced, and to direct the system to switch between modes of operation, as detailed below. The operator may revise, add, or remove optimization criteria from consideration.

Automatic machines (robots) may be built to service a single surface, e.g., in the examples herein. However, it may be challenging to build a robot that may effectively service a single surface, and move between surfaces within the field, so that it may service multiple surfaces that are physically separated. This difficulty may be because of the energetic requirements of movement between surfaces, which takes away from the energy remaining for service, or it may be because motion between surfaces requires mechanical devices that may not, or are inefficient, or even hinder motion on the surfaces (e.g., moving in water between hulls of ships).

Described here is an approach for two or more types of robots to interact for servicing fields containing multiple separated surfaces. A service robot may service a single surface or multiple surfaces that may be sufficiently close to each other so that it may reach them on its own. A transport robot may be capable of transporting one or more service robots or other transport robots between surfaces which the service robots may not reach on their own. The transport robot may also transport service robots and other transport robots from and to base stations in which the service robots and other transport robots may be serviced, refueled or recharged, maintained, and/or stored. In this way, the separation between surfaces may be overcome, without expensive and complex robots that may both service a surface and move themselves from one surface to the next. That said, transport robots may assist the service robots and/or service the surfaces themselves.

A robot system may contain several different types of robots, where a first type of robot is intended to service the surfaces, and other types of robots may transport or service the first type and/or each other. Types of robots are distinguished by one or more of their characteristic shape, mechanical features, computational capabilities, sensing capabilities, payloads, actuation capabilities, mobility in, or on the boundaries of different mediums (such as air, water, ground, vacuum, and the like), and their ability to service other robots or surfaces. Transport robots may be distinguished by their capability to transport one or more other type of robot.

Positioning includes at least three processes: pack formation (pickup), pack disbanding (drop-off), and pack motion (i.e., in a transport activity). These processes may require transport robot and service robots to participate for the tasks to be carried out in a controlled and safe manner.

In some embodiments, the safety of the surfaces is considered. For example, when a pickup occurs, the transport robot may not apply damaging pressure to the surface, and under most applications, is therefore forbidden from touching it, as the mass of a transport robot is too heavy for the surface to bear. For example, when a drop-off occurs, the service robot may be positioned exactly on the surface; it may not drop onto it utilizing gravity, winds, or currents. Otherwise, the force resulting from the mass of the service robot hitting the surface with the acceleration from natural forces may damage the surface. Or, such forces may even move the service robot away from the surface (for instance, in dropping off a hull service robot on a ship's hull, actual contact may be made between the service robot and the hull, or currents may carry it away; likewise, with window-cleaning robots being positions on windows, gravity may pull them down unless they contact the window). For example, when a transport occurs, the robots move together under the power of the transport robots. The mechanical coupling of service robots, such as mass, shape, and the like, to the transport robots affects the ability of transport robots to control their movement, and thus may put the surfaces at risk of damage. This important constraint may be termed "surface safety constraint" or the "safety constraint".

Some solutions may use proximity (or range) sensors on the transport robot, measuring distance between a transport robot and the relevant surface. However, these sensors may not accurately measure distance, and thus, the transport robot may not accurately identify its position with respect to the target surface. This risks damaging the surface by either the transport robots colliding with the surface, or causing a collision between a service robot and the surface.

Following are a few examples of these difficulties below. For example, a UAV transport robot may attempt to use a downward-pointing laser range finder to measure distance to objects below it, such as surfaces, robots, protrusions, and the like. However, the laser range finder sensor is susceptible to errors when used with glass surfaces, such as transparent PV surfaces. For example, laser sensors often see through them or when the work surfaces are translucent, the work surfaces may reflect the laser back and give false readings.

For example, a transport robot may use ultrasonic sensors that measure distance using sound/pressure waves. However, accuracy of sound waves may change with the angle of the surface to which distance is measured and with respect to the angle of the sensor. For example, where that angle is not 90 degrees, they measured distance readings may have very large errors, such as 10-20 of percent error.

For example, a transport robot may use infrared sensors to measure distance using the intensity of reflected light in the infra-red frequency range. However, the measurements of infra-red sensors change with the temperature of the surface, and are also affected by the ambient temperature. These factors may cause large errors in the di stance measured.

For example, a transport robot may use a touch-sensor connected to the end of a telescopic mechanical appendage or probe attached to the transport robot, whose length may be changed dynamically. By extruding the prong towards the surface and measuring its length when the touch sensors indicates that the surface has been reached, the distance to the surface may be measured. However, even here there are errors in the estimated length of the prong. In addition, there are significant limitations on such prong, both in terms of limited range of operations, as well as when an external mechanical device affects the shape, mass, and maneuverability of the transport robot.

For example, a transport robot may use several cameras with overlapping view-fields to use the principles of stereoscopy to estimate the distance of the surface from the transport robot. However, this depends on being able to identify common features in the images resulting from the cameras. A clean, all white surface, where no such features exist, an accurate measurement may be difficult. Additionally, a surface having many identical features may confuse the stereoscopic algorithms and result in erroneous measurements. For example, when the corners and lines of photovoltaic panel surfaces look identical.

For example, a transport robot may use projected light patterns (such as in infra-red frequency ranges), and process images from a camera capturing the projection to identify distortions, from which distance may be measures. This method may be susceptible to external sources of light, either artificial or natural, and may also be affected by temperature of the surface and the environment.

In addition to the difficulties discussed herein, many methods may provide distance measurements at a single point. For example, to estimate the angle of a surface for a drop-off, when the service robot may be aligned to the angle of the surface, multiple points may be measured simultaneously, and the service robots and/or transport robots may align themselves to the surface to avoid any impact. This may be difficult or impossible (e.g., due to possible collision between transport robot and surface, or due to limited controllability by the transport robot of the entire pack, e.g. under wind or currents).

Describe herein are procedures for a single transport robot (transport robot) and a single service robot, but the procedure is easily extensible to multiple transport robots and/or multiple service robots.

Following are detailed descriptions of major components of a robotic system.

Transport robots may be robots which carry other robots, using a mechanical carrier element. Transport robots may include unmanned aerial vehicles (UAVs) which are capable of flight. Examples of such transport UAVs include but are not limited to fixed wing and rotating-wing aircraft, such as (but not limited to) airplanes, helicopters, quad-copters, hexa-copters, and octo-copters, and other vehicles capable of vertical take-off and/or vertical landing. Transport robots may also include unmanned marine vehicles (UMVs) which are capable of motion on water surface, and/or underwater. Examples of such transport UMVs include but are not limited to unmanned boats, submarines, marine gliders, amphibian robots, and the like. Transport robots may also include unmanned ground vehicles (UGVs) which are capable of motion on a hard surface and/or underground. Examples of such transport UGVs include but are not limited to legged robots, wheeled robots, tracked robots, combination platform transport ground robots (e.g. combinations of wheels and tracks, etc.), and the like.

Service robots may be robots which service surfaces and/or other robots. Service robots may be coupled to transport robots using mechanical coupling elements.

Optionally, transport robots may assist in servicing the surfaces. For example, surface servicing is spraying of fluids on the surface. Another example is on the use of rotating, moving, or fixed brushes to wipe the surface. One example of a transport robot assisting the servicing of a surface is the use of water currents generated by a UMV to move dirt away from the surface of a ship hull, or to loosen it. Similarly, another example is the use of the wind created by a UAV's down-draft to blow dust away from a panel, or using a UAV to spray cleaning materials on a surface. A different example is the use of a UAV to transfer power to a UMV (this is an example of one transport robot servicing another).

Robots in general may execute computational processes by one or more hardware processor for their own control, and may also execute computational processes on behalf of other robots, to generate controlling commands for other robots, and the like.

Optionally, robots may be constructed with their outer surfaces are covered with materials that actively or passively reject dust, and/or allow recharging power sources from the light, heat, or chemical interactions with the environment in which they move. All robots may be constructed such that they are protected from damages from the environment.

To localize (position) themselves in relation to a target surface, robots may use standard sources such as satellite- or ground-based radio localization services (such as GPS, DGPS), or other sensory aids that are specific to the target surface or the general area in which this and other surfaces are locations. For example, passive markers may respond to external power or radiation sources, such as color markers, light reflecting markers, radio frequency identification (RFID) tags, and the like. These passive markers may be placed in advance at various locations in the general area or on a work surface. For example, active markers may emit power or radiation, such as light sources (visible and invisible), sound (human-audible or in-audible), electro-magnetic (radio) waves, and the like. These active markers may be placed in advance on various locations in the general area or on a work surface.

By using active or passive sensing devices capable of sensing one or more of these markers, a robot may localize itself within the general area and/or the target work surface. In addition, the robot may use sensing devices to track its position as it moves, by measuring distances, acceleration, and the like. For example, reflection or electro-magnetic field strength with respect to the surfaces and the ground. For example, using the change in reflection from the surfaces to monitor them, or localize on them. For example, by differentiating the markers from the ground, and using images (in human-visible or invisible frequency spectrum) to identify specific locations. One example process used for such localization is called SLAM (Simultaneous Localization and Mapping).

Robots may be protected from impact with the ground or surface, or from sinking into the water in an uncontrolled manner, and from collisions, in a way that may not hinder their flight capabilities, and their capacity for servicing and monitoring surfaces and other robots. Examples of such protections may include the use of parachutes, liquid bags, air bags, pressurized air or liquid, pumps, flotation devices, semi-rigid wire net, such as metal, plastic, or other material, surrounding the robots, and the like.

Robots may include communications equipment that allows them to be commanded, controlled, guided and/or tele-operated from the control stations. Robots may also transmit communications on behalf of other robots, acting as routers or repeaters.

Robots may dock with stations, such as base stations, repair station, charging stations, and the like, that provide servicing, recharging, storage, etc. The stations themselves may have facilities for solar, wind, or current-based power generation, thus reducing or eliminating their dependence on external power sources. The base stations are built such that the transport robots may transfer service robots onto them (i.e., may position the service robots in docking), and/or the robots (of all kinds) may dock with them. When docked, robots may be serviced in multiple ways (for example, cleaned and recharged at the same time), or may simply be stored.

The docking mechanism may utilize gravity and other environmental forces (e.g., wind, water currents) to assist in securing the docking so that robots may dock while spending less of their own energy in docking. For example, a UGV robot that has a drained battery may dock with the base station for servicing and recharging.

The docking mechanism may allow identification of the vehicle that is currently docked. The base stations may include one or more docking positions, so that more than one robot may be able to dock and/or stored at the same base station. The base station may close and seal itself against dirt, wind, water, humidity, dust, sand or any contaminate, to protect the docked vehicles are protected from it. The base station may also be manually closed and sealed.

The base stations may communicate to the control stations, and to each other, and may report on their status. For example, what vehicles are docked, what is the status of each docked vehicle, what time a docking occurred, predictions about what time servicing of each docked vehicle is likely to terminate, and the like. For example, how many open docks are currently available for docking with vehicles, how many docks are currently used, the types of robots that may be docked, what services may be provided to each docked robot, what services may be provided in the open docks, and the like.

Control stations serve to command, control, and coordinate all the different systems discussed herein. The control stations may communicate with the various robots, to command them, pass messages from any robot, base station, charging station, or control station to any other of these. A control station may also run computational processes on behalf of the robots, or run monitoring and mapping processes, analyzing the results autonomously, and/or displaying them to operators.

The control station may receive data from the robots, surfaces, other sources of information, and various types of stations, to identify the state of the surfaces, robots, and stations (historically, currently, and projecting ahead), either in real-time or not. The state of surfaces and robots and stations may include the identification of the location and status of all robots of all types, relative to field of surfaces, service level, maintenance level, charge level, energy savings/output efficiency, in real-time and non-real-time (e.g., statistics over window of past), with identification of robot. The information may be used to carry out diagnosis and failure detection processes, anomaly detection processes, and other processing that pertains to the correct operation of the robots.

The identified robot states may be presented to human operators in the control stations. One or more specialized displays and screens may be used to display information, state, and all process results (monitoring, mapping, diagnosis, fault-detection, servicing state, robot and station state, etc.) The displays may use any kind of visualization technique, such as displaying numbers and/or shapes and/or text and/or color to better convey the information to be presented to the human operators.

The control station software, the robots, and all stations may have an application programming interface (API) which allows adding capabilities, transmitting new data from various sources, getting available information to the control stations or any of the robots and other stations, and transmitting information.

The transmission of data from control stations to robots and vice-versa may take place either directly, from each robot to all others, and to all stations, and vice versa/The robots may serve as message routers, to improve the communication capabilities and/or bandwidth requirements. In this way, a message from a robot or station A is transmitted to B not directly, but through one or more intermediate robots/stations, such as C1 . . . Cn.

Overall, the objective of the system may be to efficiently service surfaces, by relying on transport robots to carry service robots to/and from stations and in-between surfaces. The transport robots may also service each other, but this is a secondary function. The system employs algorithms that manage all components of the system: the robots and the various stations. Optionally, the algorithms also manage the surfaces, relying on their identified state as aggregated in the control station. The algorithms may consider all or a subset of the processed and non-processed information available to the robots and the various stations, from any component of the system, external information sources, and the surfaces. The algorithms may consider any subset of past information of the above, and including in addition previous recommendations made, and the responses of the human operator and any system component (robots, stations, surfaces).

The algorithms' output may involve a recommendation as to the future motion trajectories of the robots, the future positions of robots, the assignments of tasks (service, monitoring, docking, etc.) to robots and stations, modes for the various systems (e.g., a reset or default operation mode, a mapping mode, a service mode of any type, etc.) The recommendations may also include assigning robots to pick up or service other robots. Thus, multiple robots may collect, deposit (e.g., into the base stations), and service other robots.

These recommendations may span multiple overlapping time horizons, from milliseconds to many days. The recommendations may be made available to the stations and robots as needed, and be accessible (through a display or other means of human-readable communications) to the human operators, such as for remote operations. The recommendations may also be automatically or semi-automatically executed by the system. The human operator may intervene, modify, cancel, approve, revise the recommendations at any time.

In creating the recommendations, the algorithms may consider the service and monitoring needs of robots, surfaces, and stations. They may base the recommendations on the needs for service and/or monitoring of any of the components, on the past or present commands of a human operator or his/her wishes (as communicated to the system via some human-machine interface), on possible detected faults or anomalies (and/or their diagnosis), weather information and other external information sources, etc.

Transport robots may service and pickup/put-down service robots. The mechanism that allows this, such as a mechanical element, may be attached to the transport robot and the service robot. The may also include reciprocal mating elements on the other robot, such as male and female structural elements. The coupling elements allow the robots to form a pair, which is coupled securely, such as sufficiently for motion between surfaces, or between a surface and a station. The mechanical element may not require active (powered) participation from the service robot so it may therefore work even when the service robot has no or little power left.

When a service robot is connected to a transport robot via coupling elements, it may be serviced by the transport robot, for example getting recharged or resupplied with servicing materials (e.g., cleaning materials). The inverse direction, service robot servicing the transport robot, is likewise possible. For example, a service robot may transfer materials or power to a transport robot.

The coupling elements are activated by the transport robot, or by the service robot, or both. It may also be triggered (to lock or release) by the docking stations, so that when a transport robot brings a service robot into a docking station or a base station, the locking mechanism may be automatically released and/or an appropriate signal may be sent to the robots and docking (or base) station.

The system may utilize the robots to identify and locate target surfaces and general areas requiring servicing or more detailed monitoring. Such identification may also be made on a continual, persistent, or repeating basis to provide monitoring of the surfaces, identifying changes to their state. To do this, the system, optionally through the control station(s), may:

Commands the transport robots to move at an altitude (for UAV) or depth (for UMV), or distance that extends their range of sensing to cover larger areas, as appropriate.

Command the robots to report sensor readings which may indicate the need of surfaces for servicing. The sensor readings (e.g., images) may be transmitted or otherwise communicated, in real-time or not, to the control station. There, automated means or human input may be used to evaluate the need for service in the sensed areas.

The procedure above may also be used to identify physical damage or theft of surfaces, changes to their shape, orientation, position, etc.

To determine whether a target surface area requires servicing, any number of sensor modalities may be used, in different ways. For example, video footage and the use of image processing, visible or invisible-light (IR, UV) cameras, lasers, sound responses (sonar), etc. Example methods that may be used to identify surfaces requiring servicing including sensing the electro-magnetic field, their light (visible and invisible) reflection, their heat reflection, sound response, etc.

There may be two issues in managing the fleet of heterogeneous robots for maximizing their ability to service surfaces:

Scheduling the pickup and drop-off activities: which transport robots pickup which service robots, when and where (which surface or station), and when and where (surface or station) do they drop them off.

Positioning: The actual coordination of robots when forming a pack (a pickup), disbanding a pack (a drop-off), and pack motion (pack transport activity), such that they are safe (to the surfaces involved and the robots).

Following is a description of the information maintained by the system and provided to the algorithms used to plan, schedule, monitor, and carry out the servicing of the surfaces in the field.

The field and surfaces contained within it may be represented geometrically, logically, topologically, and the like. Geometric representation of the field and surfaces means representing the two-dimensional (2D) or three-dimensional (3D) characteristics of each surface. For instance, a polyhedron (in 3D) or polygon (2D) is used to represent the surface within a given limit of error. Another method may store only the 2D or 3D coordinates of certain points on the surface, or of line segments that define the borders of the surface and their location in space. The field may be represented by the scaled polygon (polyhedron) circumscribing all surface-representations, along with any additional associated structures (e.g., control stations, docking or base stations, fuel and storage facilities, perimeter roads, maximum allowed altitude or maximum depth, etc.). Or it may be represented by the collection of 2D/3D point coordinates that constitute the field, or the parameters and/or coordinates of the line segments or geometric surfaces that correspond to its internal structure. Each 2D or 3D point in the field is uniquely assigned a point in the geometric representation, and vice versa. A geometric representation is thus a scaled metric map (2D) or model (3D) of the field and surfaces.

A logical representation of the field and panels may involve assigning a potentially-unique identifier (string and/ or number) to each panel and station, to each objects and structure, such that given a point in the field, or in its geometric representation, the identifier of the object to which it belongs, if any, is known. Moreover, the identifier may distinguish different objects: panels from roads from stations, etc. When the point is in free space (i.e., is not associated with any object), it may be assigned an identifier which distinguishes it as free. Any point may be assigned an identifier which distinguishes it as being forbidden to move through, thus indicating that robots may not move on a trajectory through this point. Points within objects may thus be distinguished, but also free-space points might be assigned such identifiers (e.g., to represent zones where no robot may move, i.e., "no-fly zones"). A logical representation of the field may be a labeling of every point in space, such that different objects and free space may be differentiated and may be identified.

A topological representation of the field and surfaces involves creating a mathematical graph, composed of vertices and edges, that represent objects on the field and their physical connections. Points in the field, or in a geometric representation or a logical representation of the field and its constituent objects, which may be part of the same object, may be represented by a single vertex which is assigned an identifier common to all of them. Such objects do not include free points. Thus, each vertex represents an object in the field. Additional information associated with each vertex may include records of service or products of processing thereof, estimates of the duration of service under various conditions, for each type of service, a projection of the expected time until each type of service is repeated, a projection as to failure time, etc. Vertices which represent intersections of motion routes for transport tasks or pack service tasks may be a part of a topological representation of the field.

When a transportation route exists between two different objects in the field (i.e., there is a sequence of adjacent free points that connect the two objects, and that a pack may travel through), then an edge may be added to the graph, connecting the two vertices representing the two objects. The metric length of the route may be noted on the edge, as may other information pertinent to planning transport-packs and pack service tasks that may make used of the route (e.g., width of road if on ground, curvature and absolute angle of route, allowed speeds of movement, accessibility to different types of robots, etc.). When motion is allowed on the route in only a single direction, the route is said to be directional, and the direction is associated with the edge. Otherwise, when motion is allowed in both directions between edges, then two directional edges are created, one in each direction. When multiple different routes exist between objects, they may be represented by different edges between the corresponding vertices. The determination of the existence and characteristics of routes is described below. Edges may also represent physical separation between objects without the possibility of robot motion between them, i.e., non-routes.

Determining which routes are feasible (exist) for pack transport tasks may be done automatic, manual or a combination of these. The process generates feasible routes for all possible packs compositions, and for transport robots. In general, several types of feasible routes may be distinguished:

Routes for transport robots moving on their own from or to the stations where they recharge, get serviced, or stored.

Routes for transport robots moving on their own from or to the stations where service robots may be recharged, get serviced, or stored.

Routes for packs (i.e., transport robots including one or more transport robot, physically connected through coupling elements to service robot) moving between surfaces, i.e., routes for transport tasks where the starting position and goal position are associated with surfaces.

Routes for packs (i.e., transport robots including one or more transport robot, physically connected through coupling elements to a service robot) moving between surfaces, and stations (e.g., for recharging) i.e., routes for transport tasks where the starting position is associated with a surface, and the goal position is associated with a station (or vice versa, i.e., a route from a docking station for recharging to a surface, or from a surface to a storage station).

Any feasible route thus distinguished may have additional information associated with it, also a product of the process generating the routes. Such information may include:

Safe speeds and/or altitudes and/or depths and/or direction for the pack or transport robot moving it.

A mark that a route is not to be used for packs, only for transport robots (or vice versa), or allowed for both.

A mark that a route may be stacked (i.e., transport robots moving at different altitudes or depths may go in opposite directions safely.

Safety margins in two or three dimensions, that denote the spatial envelope within which motion is safe.

A unique identifier (string or number or combination) for the route.

This information may be associated with each route separately for each type of robot, and for any composition of packs.

For the system to carry out the scheduling of tasks and use of routes, information may be maintained about each robot. This information may include:

The estimated 2D or 3D position of the robot at any given time. The position may be represented in global coordinate system (e.g., a GPS), in a coordinate system associated with the field (i.e., where all positions are determined relative to an origin point associated with the field), relative to a given surface and an associated origin point.

The route identifier which the robot is currently traveling on (if in a pack or a transport robot), or the object identifier for the surface it is currently servicing (for a service robot), or the station where it is stored, serviced, or recharged.

The type of robot, the services it provides, etc.

The current battery, fuel or power levels, including estimated duration to depletion of such.

Fault information associated with the robot.

Last time in which it was known to communicate with the control system, or any other robot.

A unique identifier.

Robots take on activities, such as tasks, services, and the like. An assigned activity may be represented by a data structure containing the following information:

The type of task involved (transport task, pack service task, surface service task, recharge task, etc.)

For tasks involving service: The service(s) involved (e.g., application of a specific material, recharging, inspection, diagnostics, monitoring, cleaning, etc.), and all details associated with the specific service(s):

The expected duration of the service, the expected termination time, the expected beginning time of the service (if not already started) or the duration that the service is already taking place.

The identifier of surface or robot being serviced, battery being recharged, etc.

The identifier of the robots (or station) providing the service, their power status (including current and predicted power levels), etc.

The priority of the task on some absolute scale, or in relation to other tasks pertinent to the same or other surfaces.

For example, this represents the information pertinent to the services associated with the task.

For tasks involving a pack the unique identifiers of the robots in the pack, and each robot's role, the details of the physical connection between pack members, the time in which the pack was formed, and the time in which the pack is supposed to be disbanded, the current and predict battery power levels and duration until power reaches non-functional levels. In addition, when the task is assigned a route, then all details of the route (or a unique route identifier that be used to find the information) may be stored with the activity as well. The position of the pack (current estimated and predicted), priority of transport (absolute or relative to other transports), etc., may also be stored.

For transport robot tasks: the unique identifier of the transport robot, its current and predicted power levels, beginning time of flight and remaining expected time of flight, transport robot position (current estimated and predicted). In addition, when the task is assigned a route, then details of the route (or a unique route identifier that be used to find the information) may be stored with the activity as well. Similarly, when the task is assigned a priority, it may also be stored.

When an activity is not yet assigned to a robot, it may contain the information described above, except for the identities of the robots involved (which are marked to denote that the robot(s) are not yet known to the system). Likewise, when the route information is not yet known, then this information may be marked as unknown.

The objective of the system is to generate and assign activities to robots and routes such that when the activities are carried out close to the beginning times stored in the activity data structure, the utilization of the robots and resources may be maximized, and the field may be serviced as efficiently as possible, i.e., a maximal number of surface may be serviced by a minimal number of robots, and/or in a fixed time duration.

Determine the full or partial order in which surfaces should be serviced may be done by creating a schedule which yields effective service, with minimal idle on behalf of service robots waiting for their next operation to begin outside of their charging or docking stations. Such a schedule may allow flexibility, in that it may specify surfaces that have equal priorities (in which case an arbitrary choice of ordering, or a choice based on other factors, such as remaining fuel or distance, may be made). The scheduling process is triggered either automatically, or in response to manual command by a human operator, e.g., via the control station or remotely. Examples of automatic triggering of schedules include (but are not limited to):

An automated process which considers meteorological data and other data about surfaces to recommend services before or after a storm.

A process considering the results of an automated or manual inspection (a type of service) which identifies surfaces in need of service A process which determines the regularity (frequency) in which surfaces are to be services.

The addition or removal of surfaces (e.g., a hull-cleaning service might be needed when ships enter a port, or a hull-inspection service may be needed when they leave).

In solar panel cleaning, the position and timing coordination may be handled opportunistically: The service robot requiring transportation may signal a control system, and wait until the control system signals a transportation robot to pick it up. This may waste time while the service robot waits, which could have been saved when the transport robot would have already awaited it as it finished servicing the panels. Moreover, when two or more transport robots are used, then careful scheduling of their motions along paths may be required, so they do not interfere with each other, and to minimize transportation time.

In general, several algorithms may be applied to this scheduling task, generally falling under the umbrella term of 'management of organized behavior', such as those based on vehicle routing solvers, job-shop scheduling, the Hungarian algorithm and its extension for multiple robots, and the like. For example, Beck et al describe an algorithm in "Vehicle routing and job shop scheduling: What's the difference", Proceedings of the 13th International Conference on Artificial Intelligence Planning and Scheduling, 10-14 Jun. 2013. For example, Dantzig et al. describe an algorithm in "The Truck Dispatching Problem" Management Science, 6 (1), pp: 80-91, October 1959, doi:10.1287/mnsc.6.1.80. For example, Christofides et al. describe an algorithm in "The Vehicle Routing Problem", 1979, Chichester, UK, Wiley. pp. 315-338. For example, Frazzoli et al. describe an algorithm in "Decentralized algorithms for vehicle routing in a stochastic time-varying environment", Proceedings of the 43rd IEEE Conference on Decision and Control (CDC), 14-17 Dec. 2004, pp: 3357-3363 Vol. 4, DOI: 10.1109/CDC.2004.1429220. For example, Psaraftis describes an algorithm in. "Dynamic vehicle routing problems", Vehicle Routing: Methods and Studies, 1988, 16, pp: 223-248. For example, Bertsimas et al. describe an algorithm in "A Stochastic and Dynamic Vehicle Routing Problem in the Euclidean Plane", Operations Research, 1991, 39 (4), pp: 601-615, doi:10.1287/opre.39.4.601. JSTOR 171167. For example, Toth et al. describe an algorithm in "The Vehicle Routing Problem", 2001, Philadelphia: Siam, ISBN 0-89871-579-2. For example, Wurman et al. describe an algorithm in "Coordinating Hundreds of Cooperative Autonomous Vehicles in Warehouses", Proceedings of the National Conference on Innovative Applications of Artificial Intelligence (IAAI), Jul. 22-26, 2007, pp: 1752-1760. For example, Chan et al. describe an algorithm in "The multiple depot, multiple traveling salesman facility-location problem: vehicle range, service frequency, and heuristic implementations", 2005, Mathematical and Computer Modeling 41, pp: 1035-1053. For example, MacAlpine et al. describe an algorithm in "SCRAM: Scalable Collision-avoiding Role Assignment with Minimal-makespan for Formational Positioning", Proceedings of the Twenty-Ninth Conference on Artificial Intelligence (AAAI), Jan. 25-30, 2015, pp: 2096-2102.

For a pick-up to occur, the service robot and transport robots may both be present at the same time in sufficient proximity between them so that coupling elements may be used to physically connect them. In addition, because of the safety constraint, the actual physical connection may be established without harm to the surface.

Following are example stages of a pickup procedure embodiment.

A pickup procedure is initiated by a "pickup request" signal which is sent from a control station, from a robot, and the like.

The signal may contain information about the location of the robot to be picked up. This information may be in the form of the geometric coordinates in the coordinate system used by the field; or it may be in the form of a unique identifier of the object (surface or station) where the robot to be picked up is present.

The signal may additionally contain the unique identifier of the transport robots which is to respond to the pickup request. This is particularly important when the signal is transmitted to multiple transport robots of which only one is to respond; otherwise, multiple transport robots may utilize one of the many readily available task-assignment or voting protocols to decide on the transport robot which may respond.

The signal may additionally contain the unique identifier of the robot which is to be picked up.

The signal may additionally contain information pertinent to the motion of the transport robot towards the robot to be picked up, such as route information, power status and time remaining, requested velocity, obstacles expected, etc.

The signal may additionally contain information on any subsequent tasks for the transport robot, such as on the transport activity that may commence once the pickup procedure completes, the drop-off task, etc.

The transport robot may initiate movement from its current position to the position contained in the pickup request signal. The transport robot may carry out this movement in a safe and controlled manner, using readily available methods to plan the transport robot's route and trajectory avoiding obstacles, surfaces, stations, and areas forbidden for its movement. Such planning may be carried out by the transport robot or any external computational device, e.g., in the stations carry out the motion along the planned route, maintaining any safety or legal requirements for the motion (e.g., minimal altitude, no-fly zones, maximum depth, etc.)

dynamically respond to contingencies along the route, such as unexpected obstacles, dynamic motion of other robots, wind and currents, etc. Responses may include re-planning the motion trajectory and route, canceling when necessary, etc.

The specification of a goal location supplied by the pickup request signal may be sufficient for the planning and execution of a motion trajectory for the transport robot. For example, a representation of the location within the field that matches the type of specification used (e.g., GPS coordinates and a geometric representation which uses GPS as the coordinate system). The target location information may be approximate, such as when the specification is necessarily inaccurate, as it is subject to errors in measurement and estimate, or only specifies an area in which the picked-up robot is to be found (e.g., when specified by an identifier of an object such as a surface). This stage may end when the transport robot arrives at the approximate position as provided in the pickup request signal, or alternatively, when the pickup procedure is aborted.

When the transport robot arrives at the location specified in the pickup request signal, the transport robot and the robot to be picked up (henceforth in the description of this procedure, "service robot") may now locate one the other, or mutually, so that coupling elements may be used to form the actual physical connection between transport robot and service robot. For example, one or both robots may move such that their respective position is within the definition of "catching zone" defined by the carrier and arm mechanical element utilized, and the guiding frame elements incorporated.

Two cases may be distinguished. In the first case, a unique identification of the service robot is possible, distinguishing it from other robots and from the surface on or station in which it is located. In the second, the service robot may not be distinguished from other robots. In the first case, when the transport robot successfully is in the approximate location of the service robot, the transport robot may identify its relative location with respect to the service robot using one or more sensors. For example, the relative location may be specified or translated into polar coordinates where the transport robot is at the origin point, and a bearing and distance to the service robot are identified and/or computed.

Examples of such identification procedures may include:

Use of cameras, whereby the transport robot visually identifies the service robot on the surface or in the station, in an image taken of the surface or station. The translation from image coordinates (the pixels in which the service robot is in the image) to relative location may be straightforward, which may themselves require information which may be readily available (such as the altitude of a UAV transport robot, its approximate distance to the surface, etc.). There are many different known ways of using cameras for this purpose. A few examples include:

Computer vision recognition algorithms to identify the service robot, its arm mechanical element, or any visual markers on the robot or arm.

Visually identify light projections unique to the robot, where such light projects are activated by the service robot or by its arm mechanical element (see Section 3). For instance, the service robot may shine a light in an agreed upon frequency, or may turn it on and off in some predetermined regular pattern, much like lighthouses use unique light signatures for identification. To identify such patterns, multiple images are taken by the transport robot of the general area in which the service robot is hypothesized to be. By using simple background differencing or more advanced techniques, the pixels changes from one image to another pinpoint the image coordinates of the service robot.

The use of multiple methods described above (e.g., four different lights) may not only give the position of the service robot with respect to the transport robot, but also its pose (e.g., angle on the surface or in the station).

Use of one or more microphones on the transport robot to identify predetermined auditory signals (predetermined to not be confused with expected ambient sounds) emitted by the service robot or its arm mechanical element. Such signals may be used predetermined frequencies or auditory patterns, or combinations thereof; they are not necessarily in frequency ranges that humans may hear. Sound localization devices and procedures may be used for this purpose. Here, the microphones may provide at least the bearing of the relative location.

Use of RFID localization methods to identify a service robot or its arm mechanical element which contain RFID markers.

Identification procedures may be used by the service robot to identify the transport robot (directly, or through its arm mechanical element), and to position itself accordingly (if possible), and/or to report the relative location of the service robot with respect to the transport robot, so that the transport robot may move to compensate for any remaining gap in positioning.

The transport robot and/or arm mechanical element(s) and/or service robot may adjust their position to reduce the difference in their relative locations, using motion control techniques for robots. The process of identification of the relative location of the service robot with respect to the transport robot continues iteratively until the transport robot and service robot are position in the catching zone of the carrier mechanical element.

The second case is when the transport robot arrives at the approximate location of the service robot, but may not identify it uniquely, e.g., through any of the means described above. This may occur because more than one service robot is identified (for instance, two service robots are visually identified, and may not be distinguished from each other in the image), or because there no service robot at all may be identified (e.g., because of environmental conditions that interfere with the identification process). In the latter case, where no service robot may be identified readily, the transport robot may communicate its failure to the control station, and/or the service robot. One option in this case is to the abort the procedure—such a decision being taken by a process in the control station or a human operator, or by the transport robot or service robot. Alternatively, a command may be sent from the control station or from the service robot to retry the process, optionally with a different set of coordinates, or with a different method of identification.

For example, the service robot may be commanded to flash lights on its arm mechanical element in greater intensity or in different frequency, while a command to the transport robot is sent to instruct it to re-attempt identification using a matching method. Or in another example, the transport robot may move to increase its distance from the target coordinates, such that images captured by its cameras capture a larger area in which the service robot could potentially be identified.

In the former case, where more than a single robot may be identified readily, the transport robot may act as described in the handling the case of no identified service robot. When the service robot changes its identification method, it may be distinguished from the other robots. Alternatively, it may also attempt to move towards one of the identified service robots, e.g., the one closest to it, or arbitrarily chosen.

When not aborted, the transport robot and service robot may be positioned within the capture zone defined for the carrier mechanical element in use. The transport robot and service robot may now follow the capturing procedure appropriate for the arm mechanical element in use by aligning male and female elements on each respective robot.

When robot drop-off takes place, the robots forming the pack may be positioned such that when they execute the release procedure for the arm mechanical element used (i.e., the pack is disbanded), they may continue operations in a safe and controlled manner, thereby avoiding damage to either robots or surfaces. For instance, drop-off where the transport robot is a flying vehicle ("a transport robot"), and the service robot is a ground vehicle, may be done such that the ground vehicle has landed safely and without damaging itself, the transport robot, or the surface or object it has landed on.

The drop-off procedure may be initiated by a "drop-off request" signal which is sent from a control station, or from a robot, e.g., in response to the termination of a transport activity in which the pack is engaged.

The signal may contain information about the location of the surface or station for the drop-off. This information may be in the form of the geometric coordinates in the coordinate system used by the field; or it may be in the form of a unique identifier of the object (surface or station) where the service robot is to be dropped off.

The signal may additionally contain the unique identifier of the service robot which is to be dropped. This may be important when the pack is composed of multiple service robots.

The signal may additionally contain information on any subsequent tasks for the transport robot or service robot, such as on the transport robot task that may commence once the drop-off procedure completes, etc.

Optionally, the drop-off location is predetermined before the pickup.

The pack may already be maximally near the target surface or station, without risking damage to the robots or surface. This may happen, for instance, when the end of a transport activity left the pack in this position. The pack may initiate its movement from its current position to the position contained in the drop-off request signal. The transport robot (acting to move the pack) may carry out this movement in a safe and controlled manner, by:

planning the pack's route and trajectory avoiding obstacles, surfaces, stations, and areas forbidden for its movement. Such planning may be carried out by robots or any external computational device, e.g., in the stations moving along the planned route, maintaining any safety or legal requirements for the motion (e.g., minimal altitude, no-fly zones, maximum depth, etc.)

dynamically responding to contingencies along the route, such as unexpected obstacles, dynamic motion of other robots, wind and currents, etc. Responses may include re-planning the motion trajectory and route, canceling when necessary, etc.

The new computed location supplied by the drop-off request signal is sufficient for the planning and execution of a motion trajectory for the pack. For example, by a representation of the field that matches the type of specification used (e.g., GPS coordinates and a geometric representation which uses GPS as the coordinate system).

That said, it is understood that the target location information may be approximate; the specification may be inaccurate, as it is subject to errors in measurement and estimation, or only specifies an area in which the target surface or station is to be found (e.g., when specified by an identifier of an object such as a surface). In this case, the pack may maintain movement towards the target surface or station until it may no longer do so, such as when an automatic process decides that (1) it may not move further without risking damage to the surface or robots, or (2) it is within a given distance of the surface or station, where such distance is specified externally to the procedure.

The pack arrives at the approximate new location, and approaches the surface or station as described, or alternatively, the pickup procedure is aborted.

The transport robot moves the pack to align the angle of the service robot with the surface, as closely as possible.

This may be done, e.g., by actively changing the relative angles between robots using the arm mechanical element, or by changing the heading and angles of the transport robot (and thus of the pack) such that the service robot is better aligned with the surface. The transport robot moves the pack towards the center of the target surface or station, while still maintaining the minimal safety distance to it. This may increase the tolerance of the positioning procedure to errors in localization of the pack with respect to the borders of the surface or station. It may not be necessary to position the pack at the shortest possible safe distance from the center. Rather, it may be sufficient to position the pack such that the distance to the borders is within tolerance considered safe.

The transport robot moves the service robot towards the object (surface or station) in a velocity deemed safe for the robots and the object, i.e., such that impact caused by the service robot as it touches the object may not cause damage. The transport robot may stop as soon as the service robot is safely positioned on the surface; this may be detected in one or more ways. For example:

The transport robot may feel a change in the acceleration or velocity of the movement, caused by the friction or resistance of the object to additional motion.

The service robot may use its sensors and/or sensors on the arm mechanical element to determine when the service robot is safely positioned, and inform the transport robot. For instance, the service robot may use pressure sensors or short-range distance sensors in the area which is in touch (or just above) the object, and report their values to the transport robot, e.g., through the arm mechanical element, or independently. Familiar sensor fusion techniques may be used to determine when the reported values indicate safe positioning on the surface.

For example, a UAV transport robot positioning a surface cleaning robot may use several pressure sensors within the wheels or tracks of the service robot to identify when it is touching the surface. For example, multiple sensors in multiple locations may indicate all supporting parts of the robot are safely lying on the surface. The UAV may begin moving slowly towards the surface. When one or more wheels touch the surface, the appropriate pressure sensor readings indicate so. The readings are communicated through the coupling elements to the UAV. When all wheels are on the surface, all readings may indicate safe support on the surface, and the UAV may stop moving.

When no safe positioning is achieved within a given time limit, or when unsafe positioning is reported by sensors, the procedure may be aborted. Alternatively, the transport robot may move the pack back in the opposite direction, away from the object, so that the procedure may be retried (the entire stage). Once the service robot is in the correct position, the pack initiates the release procedure for the carrier mechanical element to decouple from the service robot.

When traveling as a pack, the service robot may make motion of the transport robot (and thus of the pack) more difficult. For example, sensors of the transport robots may be blocked from view by the service robots, or because the shape of service robots may interact with the surrounding fluid motion, such winds and currents, and effect the motion. For example, the mass of the service robot effects the center of mass of the pack, which is different than the center of mass of the transport robot.

Several procedures may be used during pack motion to alleviate these difficulties:

First, the coupling elements may be used to transmit sensor information from the service robots to the transport robots. For example, a surface cleaning robot with a forward-facing camera may transmit imagery through the coupling elements or through other means to the transport robot, thus allowing the transport robot a different angle of view to identify obstacles. Or a downward facing camera in the cleaning robot may transmit imagery which may be used to estimate the horizontal motion of the pack, e.g., via familiar visual odometer procedures.

Second, the arm mechanical element may change the relative position and angles of the transport and service robot, to adjust the pack overall shape, its center of mass, to make motion easier and less affected by environmental conditions (such as winds and currents).

A mechanical coupling element is the term to refer to mechanical elements of any coupling mechanism between the two robots, such as used to form a pack, by physically, electronically, and logically connecting robots. For example, this is different from a physical connection between a robot (or vehicle) and payload. The mechanical element itself may be made from one or more elements, attached to one or more robots.

A coupling element has several important characteristics:

It may form a safe and reliable physical, mechanical connection, whereby one or more robot connects to one or more other robot, such that motion by the transport robots moves the connected robots.

This, for instance, distinguishes coupling elements from other mechanical element s used for vehicle-to-vehicle refueling, e.g., in the air or sea (where both vehicles may coordinate their movement for the refueling to take place). The physical connection of a fuel line may not translate motions of one of the vehicles into motions of the other vehicles.

The formation of the safe and reliable physical connection may be called capturing. For each embodiment of a carrier mechanical element, there exists one or more specific 2D or 3D area called a capture zone, which lies near the arm mechanical element. When two robots are positioned within their respective mechanical element in the capture zone, they may engage in a capture procedure. Once the procedure is run successfully, motion of the transport robot causes motion of the service robot.

The disbanding of the physical connection is called release. For each embodiment of carrier mechanical element, there exist one or more specific 2D or 3D area called release zone, which lies near the arm mechanical element (often, identical to the capture zone. When transport and service robots are positioned within the respective mechanical element release zones, they may start a release procedure. Once the procedure is run successfully, motion of the transport robot is independent from the service robot.

The mechanical element may be used by two or more robots, whereby one or more of the robots is autonomous, i.e., not controlled by a human, locally or remotely. The deployment and operation of the mechanical element is controlled by the connecting robots, and they may autonomously adjust their position or pose, or deploy additional processes and devices, to aid in the forming of the pack via the coupling elements. After the formation of the pack, the robots may further adjust their pose or deploy additional processes and devices to assist in the motion of the pack, e.g., to make it more efficient. For example, distinguishes the coupling elements from an inter-vehicle locking mechanisms, which depend on human supervision and/or control to be deployed, e.g., when one vehicle is towing another.

The mechanical element allows flexibility in the relative poses of the robots in a pack, with respect to each other, so as facilitate motion of the pack (e.g., to improve maintenance of center of gravity, control or efficiency of flight, etc.). For example, the arm mechanical element may be physically shaped to maintain robots in a certain angle with respect to the direction of movement of the pack, and/or the surface. In another example, an arm mechanical element used to connect a UAV transport robot and a UGV service robot and the arm mechanical element allows passive (e.g., due to wind) or active (by the robots themselves) change to the angle of the UGV with respect to the UAV, to improve balancing and facilitate easier control of the flight. In another example, an arm mechanical element used to connect an unmanned boat (here, the transport robot) which is carrying a hull-cleaning robot by flexibly dragging it in the water. The water currents may cause changes in the position and angle of the robot with respect to the boat, allowing for motion with less resistance from the water.

The coupling elements may form at least two of three levels of connection between the robots in the pack:
  A mechanical connection, which may be used safely and reliably for the joint motions of the robots.
  A sensing and actuation electrical connection, allowing a transport robot to utilize the sensors and actuators of a service robot, or vice versa. For instance, a transport robot transport robot may utilize the sensors on the underside of a service robot to measure distance to surface or floor; or it may use video imagery from cameras on the service robot to stay clear of obstacles, estimate the pack movement relative to the field, etc.
  A communications connection, by radio-frequency, light, or electrical means, which may allow the transmission and receiving of information pertaining to commands, control, monitoring of the pack, or to the motion of the pack, or to the activities of the pack and the robots that constitute the pack. Such information includes also the results of any computation carried out by one robot for the benefit of another, e.g., the video imagery in the example above may be processed wholly or partially on the service robot before being transmitted to the transport robot.

The coupling elements may allow multi-directional transmission of information, commands, and control. Transport robots in the pack are responsible for the physical motion of the entire pack, but the control of the motion is not necessarily carried out in any one robot, nor necessarily in the transport robot. It is possible for a service robot to be in command and control of the motion of the entire pack, as an example.

Aspects of embodiments that are suitable are a pair of matching mechanical connectors, such that one of the pair has a bulbous protrusion that is of a first size/shape, such as a male mechanical element, and such that the second of the pair has a large receiving region, such as significantly larger than the first size/shape, such as a female element, to guide the protrusion into a carrier element that has a second size/shape smaller than the first size/shape. Thus, the protrusion can temporarily "lock" into the carrier for the transport robot to carry the service robot. For example, the protrusion mechanical element is part of an arm mechanical element attached to service robot, and the carrier element is attached to the transport robot. Alternatively, the arm is attached to the transport robot and the carrier is attached to the service robot. Alternatively, to a male and female mechanical carrier elements there can be two similarly sized/shaped mechanical elements, such as two hooks, each attached to a robot, such that one hook latches with the other hook. Similarly, other options for latching mechanical elements of substantially the same size and shape can be designed.

Optionally, the protrusion can have an isotropic symmetrical shape, such as a ball, so that the service robot may rotate freely within the carrier mechanical element. For example, the protrusion is a ball with annular electrical connectors for transferring sensor signals, transmission signals, power, and the like. Optionally, the protrusion has an anisotropic symmetrical shape, such as a brick with a curved bottom, so that the service robot can rotate freely only on one axis, within the carrier mechanical element and the electrical connectors aligned parallel to a curved edge. For example, a brick with a curved bottom shaped protrusion has a single axis of rotation to allow the service robot to align with an angled surface. For example, the hemispherical protrusion has annular electrical connectors and a receiving conduit on the center of the flat surface of the hemisphere for transfer of service materials, such as fluids.

Optionally, optical signals are used to transmit information, such as proximity sensor values, robot status, and the like, between the service robot and the transport robot. For example, a light emitter sends light in pulses which are captured by optical sensors on the matching elements and translated into digital value signals. Optionally, the protrusion has multiple radial connectors, and the two sides of a funnel of the carrier mechanical element are used to transmit signals, electric power, and the like. For example, two contacts on the protrusion are selected dynamically, each one in electrical contact with one half of the carrier element, thereby establishing a two-wire connection which can be used to transmit signals (e.g., by serial communications), electricity, and the like.

In addition, the coupling elements may have additional characteristics:
  The coupling elements may form a connection through which fuel or electricity or power may be transmitted, for the purposes of recharging one or more of the robots in the pack. Recharging may take place in one direction (from one robot to others), or in multiple directions (from one robot to others, from another robot to the first robot and others, etc.).
  The coupling elements may form a connection by which materials used to service the surfaces or other robots may be transferred (e.g., cleaning and maintenance materials in liquid or gas or solid form).
  The coupling elements may form an electrical connection such that the coupling elements enhance radio frequency transmissions and receiving for one or more robots in the pack.
  The coupling elements may be powered autonomously, or may be powered when connected to one or more robot, or may require no power. It may have sensors and actuators or active markers on board (such as lights), which are powered by the coupling elements power source, whatever it is on the coupling elements or from the connected robots. It may have one or more hardware processor or controller on board to execute processor instructions. For example, to carry out computational processes for controlling the arm, reporting on its status, establishing connections to the robots, identifying the robots, etc.

The coupling elements may be marked by non-powered means (magnets, passive markers, including visual markings and reflective surfaces, RFID) to assist in identifying the robots, establishing connections to the robots, etc.

The coupling elements may be built to mechanically improve and ease the forming of a connection between robots. As an example, (here, of coupling elements in two parts) the physical shape of the coupling elements (in the example, in two parts), is such that the arm mechanical element part on one robot is mechanically guided into the right position in the carrier mechanical element part on the other robot. Alternatively, in an arm mechanical element of a single part, the shape of the arm mechanical element is such that a robot itself is mechanically guided into the right position as above. This reduces both mechanical shocks and control the positioning of the robots in six degrees of freedom of movement (three dimensions for position, three angles).

The coupling elements may be built to passively or actively reduce shocks when robots position themselves to form a connection.

The physical shape of the coupling elements may be fixed or may change before and during the formation of a pack, and after a pack is disbanded, to facilitate improvement in the formation process itself, or in the disbanding process. Such changes may affect the position and angle between robots, or between robots and surfaces. The change may take place passively (e.g., mechanical responses to changes in pressure), or may be actively controlled by the arm or robots.

Provided below is an example embodiment of coupling elements, to illustrate key characteristics of the arm as described above. This is a design for coupling elements in two parts. One part may be attached to a UAV transport robot, capable of lifting and flying with a surface cleaning robot (UGV). The other part may be attached to a surface cleaning robot, such that when the two parts are connected, the transport robot is a transport robot, the UGV is a service robot, and the two form a pack which may take-off, fly, and land, together.

The capture procedure for this example, where the UGV is on a surface, works as follows. The UGV positions itself at the top of the surface, angled such that the ball is at the zenith (90 degrees straight up). The angle of the arm is set to compensate for the angle of the surface to the horizon, a benefit of the arm mechanical element as described above. The UGV transmits power to the arm mechanical element attached to it, so that the light source shines light at a spectrum that may be detected by cameras on the UAV. The UAV uses this light to identify the approximate position of the UGV, and hovers above it and slightly behind it, such that the capture zone, here marked opening is above the UGV, but forward motion by the UAV may be used to bring the opening to be above the ball. The UAV may use one or more downward facing camera to identify the position of the ball with respect to the opening, whose position is known to the UAV (by presetting). This identification is done by locating the light source in the images originating in the downward-facing camera.

The UAV then lowers altitude until one or more of the following conditions occur: (1) the proximity sensors behind the opening report to the UAV that the distance to the arm holding the ball is such that the ball may be within the polygon defining the opening area; (2) a computational process may identify that the ball, visible in an image from a camera of the UAV, is within the polygon defining the capture zone (opening area); (3) the proximity sensors on the arm may report to the UGV that an object is in proximity to the ball; (4) one or more images coming from a camera on the UGV and facing up towards the UAV detect the UAV's presence and estimate its position such that the ball is within the polygon defining the opening area; (5) magnetic sensors embedded in either arm mechanical element, carrier mechanical element, or both report to the attached robots that a magnet (embedded, e.g., in the ball, or in the opening) is nearby. The communication of information from sensors in the robots and in coupling elements is an illustration of the benefit of the coupling elements.

Once the appropriate set of conditions hold, the UAV stops lowering altitude, and moves forward a small distance, enough to trap the ball within vertical space above the ball catcher. The shape of the opening mechanically guides the arm holding the ball to the correct position. The proximity sensors may be used to verify that the ball is in place, and then the UAV goes up, possibly with some forward motion as well, trapping the ball and securing it in in the ball catcher. This forms a physical connection which has some flexibility during flight (e.g., to allow some movement due to forces of wind acting on the UGV), but still may not allow the ball to leave the ball catcher, and thus disconnect.

An example robotic system using coupling assemblies may be composed of multiple unmanned vehicles (hereafter: robots), one or more control stations, and one or more base-stations, that are used together for a goal, such as maintaining, servicing and monitoring work surfaces, such as solar panel surfaces and the like. The system may be composed of one or more aerial (flying or hovering) robots (hereafter: UAVs), capable of vertical liftoff and landing, that may service, maintain and/or monitor the work surfaces. Optionally, the system comprises one or more marine robots (hereafter: UMVs), capable of moving on water and/or underwater. The UMVs may also be capable of flight. UMVs may be able to maintain, service and/or monitor work surfaces they are in contact with in a marine environment The system may also comprise one or more other robots (hereafter: UGVs), incapable of flight, which may maintain, service and/or monitor work surfaces they are in contact with. Base stations may be included in the system where the UAVs, UMVs, and UGVs may be serviced, recharged (refueled), and resupplied as necessary. The UAVs and UMVs may have the capacity to transfer the UGVs and/or UMVs between different work surfaces and/or between a given work surface to a base station. The UAVs and UMVs may also service (and/or recharge, resupply, and the like) the UGVs and other UMVs. When so, UAVs, UMVs and UGVs may optionally have specialized mechanisms for this purpose.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein regarding flowchart illustrations and/or block diagrams of methods, apparatus (systems), and computer program products per embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

What is claimed is:

1. A system for coupling between a transport robot and a service robot, the system comprising:
   a. at least one processor;
   b. a mechanical coupling element attached to a service robot, comprising a localization signal emitter, and one or more sensors for collecting measured values; and
   c. a carrier element attached to a transport robot, comprising a sensor configured to receive automatically a localization signal from the localization signal emitter, and wherein the at least one processor is configured to:
      i. receive a request for transporting the service robot;
      ii. receive a calculated location of the service robot or receiving;
      iii. receive an automatic localization signal from the localization signal emitter;
      iv. move the transport robot to the computed location; and
      v. couple between said mechanical coupling element and said.

2. The system for coupling between a transport robot and a service robot of claim 1, wherein coupling the mechanical coupling element and the carrier element provides a transient mechanical connection between said transport robot and said service robot.

3. The system for coupling between a transport robot and a service robot of claim 1, wherein said mechanical coupling element comprises a shaft and a male securing element, wherein the male securing element is larger, in at least one dimension, than said shaft and wherein the carrier element comprises a guiding sub-assembly and a female securing element, wherein the female securing element is substantially the at least one dimension of the shaft such that the male securing element is coupled within the female securing element and said guiding sub-assembly forms an opening for guiding said male securing element into said female securing element.

4. The system for coupling between a transport robot and a service robot of claim 1, wherein said carrier element comprises a shaft and a male securing element, wherein the male securing element is larger, in at least one dimension, than said shaft and wherein the carrier element comprises a guiding sub-assembly and a female securing element, wherein the female securing element is substantially the at least one dimension of the shaft such that the male securing element is coupled within the female securing element and said guiding sub-assembly forms an opening for guiding said male securing element into said female securing element.

5. The system for coupling between a transport robot and a service robot of claim 1, wherein said emitter comprises: a light source, a radio wave antenna, acoustic wave generator, or any combination thereof.

6. The system for coupling between a transport robot and a service robot of claim 1, wherein said localization signal comprises a signaling pattern that is unique to each one of the service robot and the transport robot.

7. The system for coupling between a transport robot and a service robot of claim 1, comprising: an electrical transport connection, a material transport connection, data transport connection or any combination thereof.

8. The system for coupling between a transport robot and a service robot of claim 3, wherein said guiding sub-assembly comprises (a) an opening and two guiding elements, wherein said opening is distal from said female securing element, wherein said opening is larger than the at least one dimension of the shaft; (b) an elongated element with a plurality of bends to define the opening and a funnel for guiding the mechanical element into the carrier element; or both.

9. The system for coupling between a transport robot and a service robot of claim 4, wherein said guiding sub-assembly comprises (a) an opening and two guiding elements, wherein said opening is distal from said female securing element, wherein said opening is larger than the at least one dimension of the shaft; (b) an elongated element with a plurality of bends to define the opening and a funnel for guiding the mechanical element into the carrier element; or both.

10. A method for coupling automatically between a transport robot and a service robot with a system for coupling between a transport robot and a service robot, comprising:
   (a) receiving a transport request by a transport robot, comprising a location of a service robot;
   (b) computing automatically a location of the service robot;
   (c) receiving, by an on-board processor of the transport robot, the calculated location of the service robot or receiving, by an on-board processor of the service robot, the calculated location of the transport robot;
   (d) mobilizing said transport robot, said service robot or both to the computed location of the service robot;
   (e) transmitting a localization signal by said service robot or said transport robot, wherein said transmitting and receiving said localization signal initiates coupling between a mechanical coupling element attached to the service robot and a carrier element attached to the transport robot, thereby coupling automatically between said transport robot and said service robot; and
   (f) coupling, using the localization signal, said mechanical element to said carrier element, wherein said mechanical element and said carrier element are each adapted to transfer measured values collected by sensors on said service robot to said transport robot.

11. The method of claim 10, wherein the transport request further comprises information selected from: a unique identifier of the transport robot; a unique identifier of the service robot; information pertinent to a route of the transport robot toward the service robot; information pertaining to power status or remaining time; information pertaining to a velocity; and information pertaining to obstacles.

* * * * *